United States Patent
Kim et al.

(10) Patent No.: US 9,603,127 B2
(45) Date of Patent: Mar. 21, 2017

(54) METHOD AND APPARATUS FOR ALLOCATING RESOURCES FOR PERFORMING DEVICE-TO-DEVICE COMMUNICATION IN WIRELESS COMMUNICATION SYSTEM

(71) Applicant: LG ELECTRONICS INC., Seoul (KR)

(72) Inventors: Myoungseob Kim, Seoul (KR); Hanbyul Seo, Seoul (KR); Jihyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/035,446

(22) PCT Filed: Nov. 7, 2014

(86) PCT No.: PCT/KR2014/010661
§ 371 (c)(1),
(2) Date: May 9, 2016

(87) PCT Pub. No.: WO2015/069051
PCT Pub. Date: May 14, 2015

(65) Prior Publication Data
US 2016/0295565 A1    Oct. 6, 2016

Related U.S. Application Data

(60) Provisional application No. 61/901,470, filed on Nov. 8, 2013, provisional application No. 61/936,849, filed on Feb. 6, 2014.

(51) Int. Cl.
*H04W 72/04* (2009.01)
*H04W 88/04* (2009.01)
(Continued)

(52) U.S. Cl.
CPC ......... *H04W 72/0406* (2013.01); *H04J 4/00* (2013.01); *H04W 72/04* (2013.01);
(Continued)

(58) Field of Classification Search
CPC ..................................................... H04W 4/008
See application file for complete search history.

(56) References Cited

U.S. PATENT DOCUMENTS

2009/0034447 A1* 2/2009 Yu ..................... H04B 7/15542
370/315
2010/0240312 A1* 9/2010 Peng .................... H04W 72/02
455/63.1
(Continued)

FOREIGN PATENT DOCUMENTS

WO    WO 2012/052911 A1    4/2012

*Primary Examiner* — Cindy Trandai
(74) *Attorney, Agent, or Firm* — Birch, Stewart, Kolasch & Birch, LLP

(57) ABSTRACT

The present invention relates to a method and apparatus for allocating D2D resources using relay UE in a wireless communication system supporting D2D communication. The method may include receiving D2D resource allocation information related to a first resource set used in a first cluster from the head UE of the first cluster and transmitting the received D2D resource allocation information to head UE of a second cluster. The D2D resource allocation information includes at least one of D2D resource set configuration information indicative of a configuration of D2D resource sets used in D2D communication, D2D resource set use information indicative of a D2D resource set which is now used, and D2D resource set indication information indicative of a D2D resource set to be used in a next cluster. The D2D resource set is allocated for each cluster.

19 Claims, 23 Drawing Sheets

(51) Int. Cl.
  *H04J 4/00* (2006.01)
  *H04W 76/02* (2009.01)
  *H04L 12/733* (2013.01)
  *H04W 40/32* (2009.01)

(52) U.S. Cl.
  CPC ... *H04W 72/0446* (2013.01); *H04W 72/0453* (2013.01); *H04W 76/023* (2013.01); *H04L 45/20* (2013.01); *H04W 40/32* (2013.01); *H04W 88/04* (2013.01)

(56) References Cited

U.S. PATENT DOCUMENTS

| | | | |
|---|---|---|---|
| 2011/0268004 A1 | 11/2011 | Doppler et al. | |
| 2011/0268006 A1* | 11/2011 | Koskela | H04W 72/121 370/312 |
| 2011/0282989 A1* | 11/2011 | Geirhofer | H04W 28/18 709/224 |
| 2011/0319091 A1* | 12/2011 | Lee | H04W 72/0426 455/450 |
| 2012/0106517 A1* | 5/2012 | Charbit | H04W 72/04 370/336 |
| 2013/0064146 A1* | 3/2013 | Ahn | H04W 76/023 370/280 |
| 2013/0150061 A1* | 6/2013 | Shin | H04W 4/005 455/450 |
| 2013/0223398 A1* | 8/2013 | Li | H04W 72/085 370/329 |
| 2013/0229931 A1* | 9/2013 | Kim | H04W 24/10 370/252 |
| 2013/0250771 A1 | 9/2013 | Yu et al. | |
| 2013/0273926 A1 | 10/2013 | Peng et al. | |
| 2013/0288608 A1 | 10/2013 | Fwu et al. | |
| 2013/0308551 A1* | 11/2013 | Madan | H04W 72/0406 370/329 |
| 2013/0322388 A1* | 12/2013 | Ahn | H04W 76/023 370/329 |
| 2014/0153390 A1* | 6/2014 | Ishii | H04W 76/023 370/230 |
| 2014/0179330 A1* | 6/2014 | Du | H04W 76/043 455/450 |
| 2014/0307642 A1* | 10/2014 | Wanstedt | H04W 76/023 370/329 |
| 2015/0043398 A1* | 2/2015 | Fwu | H04L 5/0058 370/280 |
| 2016/0227496 A1* | 8/2016 | Panteleev | H04W 36/0055 |
| 2016/0302247 A1* | 10/2016 | Lu | H04W 8/005 |

* cited by examiner (a)

(b)

(a)

(b)

(a)

(b)

METHOD AND APPARATUS FOR ALLOCATING RESOURCES FOR PERFORMING DEVICE-TO-DEVICE COMMUNICATION IN WIRELESS COMMUNICATION SYSTEM

CROSS REFERENCE TO RELATED APPLICATIONS

This application is the National Phase of PCT International Application No. PCT/KR2014/010661, filed on Nov. 7, 2014, which claims priority under 35 U.S.C. 119(e) to U.S. Provisional Application No. 61/901,470, filed on Nov. 8, 2013 and 61/936,849, filed on Feb. 6, 2014, all of which are hereby expressly incorporated by reference into the present application.

TECHNICAL FIELD

The present invention relates to a resource allocation method and, more particularly, to a resource allocation method and apparatus in device-to-device communication.

BACKGROUND ART

Recently, as smart phones and tablet PCs are spread out and high-capacity multimedia communication is activated, mobile traffic is suddenly increased. It is expected that in the future, mobile traffic will be increased about two times every year. Most of such mobile traffic is transmitted through an eNB, and thus communication service providers are facing with a severe network load problem. In order to handle the increasing traffic, communication service providers are increasing network equipment and have commercialized next-generation mobile communication standards capable of efficiently processing a large amount of traffic, such as mobile WiMAX and Long Term Evolution (LTE). However, another solution is necessary to handle the amount of traffic that will be further suddenly increased in the future.

Device-To-Device (D2D) communication is a distributive communication technology in which traffic is directly transferred between adjacent nodes without using infrastructure, such as an eNB. In a D2D communication environment, each node, such as a portable terminal or UE, autonomously discovers another piece of UE that is physically adjacent to the node, sets up a communication session, and then transmits traffic. D2D communication has been in the spotlight as an element technology of a next-generation mobile communication technology subsequent to 4G because a traffic overload problem can be solved by distributing traffic concentrated on an eNB as described above. For such a reason, a standard organization, such as 3GPP or IEEE, is pushing ahead with the enactment of D2D communication standards based on LTE-A or Wi-Fi. Qualcomm, etc. is developing an independent D2D communication technology.

It is expected that D2D communication may contribute to an increase in the performance of a mobile communication system and also create new communication services. Furthermore, D2D communication can support services, such as social network services or network game based on adjacency. As described above, it is expected that the D2D technology may provide new services in various fields.

The D2D communication technology that has already been widely used includes infrared communication, ZigBee, radio frequency identification (RFID), and Near Field Communication (NFC) based on RFID. In a strict sense, however, such technologies are difficult to be classified as D2D communication technologies in which traffic of an eNB is distributed because the technologies support only communication for special purposes within a very limited distance (about 1 m).

DISCLOSURE

Technical Problem

An embodiment of the present invention provides a resource allocation method and apparatus for D2D communication in a wireless communication system.

An embodiment of the present invention provides a method and apparatus for reducing interference which may occur in UE in resource allocation for D2D communication in a wireless communication system.

An embodiment of the present invention provides a method and apparatus for transmitting resource allocation information in D2D communication in a wireless communication system.

An embodiment of the present invention provides a method and apparatus for reducing interference by transmitting resource allocation information in D2D communication in a wireless communication system.

An embodiment of the present invention provides a method and apparatus for transmitting resource allocation information through a relaying method in D2D communication in a wireless communication system.

An embodiment of the present invention provides a method and apparatus for reducing interference in D2D communication in a wireless communication system by allocating the same time resource using pieces of transmission UE having a distance similar to that of reception UE as one group.

Technical objects to be achieved in this specification are not limited to the aforementioned objects, and those skilled in the art to which the present invention pertains may evidently understand other technical objects from the following description.

Technical Solution

An embodiment of the present invention provides a method including receiving D2D resource allocation information related to a first resource set used in a first cluster from a first cluster head UE and transmitting the received D2D resource allocation information to a second cluster head UE. The D2D resource allocation information includes at least one of D2D resource set configuration information indicating a configuration of D2D resource sets used in D2D communication, D2D resource set use information indicating a D2D resource set which is currently used, or D2D resource set indication information indicating a D2D resource set to be used in a next cluster. The D2D resource set is allocated for each cluster.

Furthermore, in an embodiment of the present invention, the method may further include determining, by the second cluster head UE, a second resource set used in the second cluster based on the D2D resource allocation information transmitted by the relay UE.

Furthermore, in an embodiment of the present invention, the D2D resource allocation information may further include at least one of information of a cluster to which the relay UE belongs, the index of a cluster which has triggered a relay, the index of a cluster head, the ID of the relay UE, or a hopping counter information indicating of hopping count.

Furthermore, in an embodiment of the present invention, the method may further include performing at least one hopping operation in order to transmit the received D2D resource allocation information to the second cluster.

Furthermore, in an embodiment of the present invention, at least one of the first cluster or the second cluster is formed between adjacent UEs.

Furthermore, in an embodiment of the present invention, resource sets for D2D communication may be allocated to the first cluster and the second cluster using a Time Division Multiplexing (TDM) method, and resources for D2D communication may be allocated to UEs included in the first cluster and the second cluster using a Frequency Division Multiplexing (FDM) method.

Furthermore, in an embodiment of the present invention, the method may further include sharing, by the first cluster header and the second cluster header, a plurality of resource set configuration information.

Furthermore, in an embodiment of the present invention, the first cluster head UE sets a maximum hopping count for limiting the hopping count of the relay UE.

Furthermore, in an embodiment of the present invention, the method may further include comparing, by the second cluster head UE, the hopping count with the set maximum hopping count when the maximum hopping count is set to be greater than 1. The hopping count may indicate a count that the D2D resource allocation information has been relayed through a relay operation.

Furthermore, in an embodiment of the present invention, when as a result of the comparison, the hopping count and a value obtained by subtracting 1 from the maximum hopping count are the same, the hopping count may be maintained to be identical with the maximum hopping count and a relay operation may be performed.

Furthermore, in an embodiment of the present invention, when as a result of the comparison, the hopping count and a value obtained by subtracting 1 from the maximum hopping count are the same, the hopping count may be reset to 0 and a relay operation may be performed again.

Furthermore, in an embodiment of the present invention, when, as a result of the comparison, the hopping count and a value obtained by subtracting 1 from the maximum hopping count are the same, a relay operation may be stopped.

Furthermore, in an embodiment of the present invention, the second cluster head UE may update the D2D resource allocation information based on information related to the determined second resource set.

Furthermore, in an embodiment of the present invention, the first resource set or the second resource set may be not a resource set used in an eNB.

Furthermore, an embodiment of the present invention provides a method including selecting a first resource set to be used in the first cluster and transmitting D2D resource set allocation information related to the first resource set to a second cluster head UE through relay UE. The D2D resource allocation information includes at least one of D2D resource set configuration information indicating a configuration of D2D resource sets used in D2D communication, D2D resource set use information indicating a D2D resource set which is currently used, or D2D resource set indication information indicating a D2D resource set to be used in a next cluster. The D2D resource set is allocated for each cluster.

Furthermore, in an embodiment of the present invention, the first cluster is formed between adjacent UEs.

Furthermore, an embodiment of the present invention provides a method including receiving D2D resource allocation information for selecting a resource set from a head UE of a previous cluster through relay UE and selecting a resource set based on the D2D resource allocation information. The D2D resource allocation information includes at least one of D2D resource set configuration information indicating a configuration of D2D resource sets used in D2D communication, D2D resource set use information indicating a D2D resource set which is currently used, or D2D resource set indication information indicating a D2D resource set to be used in a next cluster. The D2D resource set is allocated for each cluster.

Furthermore, in an embodiment of the present invention, the cluster may be formed between adjacent UEs.

Furthermore, an embodiment of the present invention provides an apparatus including a communication unit configured to transmit and receive signals in a wired and/or wireless manner and a control unit operatively connected to the communication unit. The control unit receives D2D resource allocation information related to a first resource set used in a first cluster from a first cluster head UE through the communication unit and transmits the received D2D resource allocation information to a second cluster head UE through the communication unit. The D2D resource allocation information includes at least one of D2D resource set configuration information indicating a configuration of D2D resource sets used in D2D communication, D2D resource set use information indicating a D2D resource set which is currently used, or D2D resource set indication information indicating a D2D resource set to be used in a next cluster. The D2D resource set is allocated for each cluster.

Advantageous Effects

In accordance with the method and apparatus for resource allocation using D2D communication according to embodiments of the present invention, the following advantages can be obtained.

In accordance with an embodiment of the present invention, resources can be efficiently allocated through a resource allocation method for D2D communication.

Furthermore, in accordance with an embodiment of the present invention, interference which may be generated in reception UE can be reduced by determining pieces of transmission UE having a similar distance to reception UE to be one group and allocating time resources in resource allocation for D2D communication.

Furthermore, in accordance with an embodiment of the present invention, interference which may be generated in reception UE can be reduced by sharing resource allocation information between pieces of transmission UE in resource allocation for D2D communication.

Furthermore, in accordance with an embodiment of the present invention, resource allocation information can be transmitted to distant transmission UE by delivering information related to resource allocation for D2D communication through a relaying method.

Furthermore, in accordance with an embodiment of the present invention, resources can be efficiently used by delivering information related to resource allocation for D2D communication through a relaying method.

Furthermore, in accordance with an embodiment of the present invention, interference which may be generated between pieces of UE can be reduced by delivering information related to resource allocation for D2D communication through a relaying method.

MODE FOR INVENTION

Figure 1:
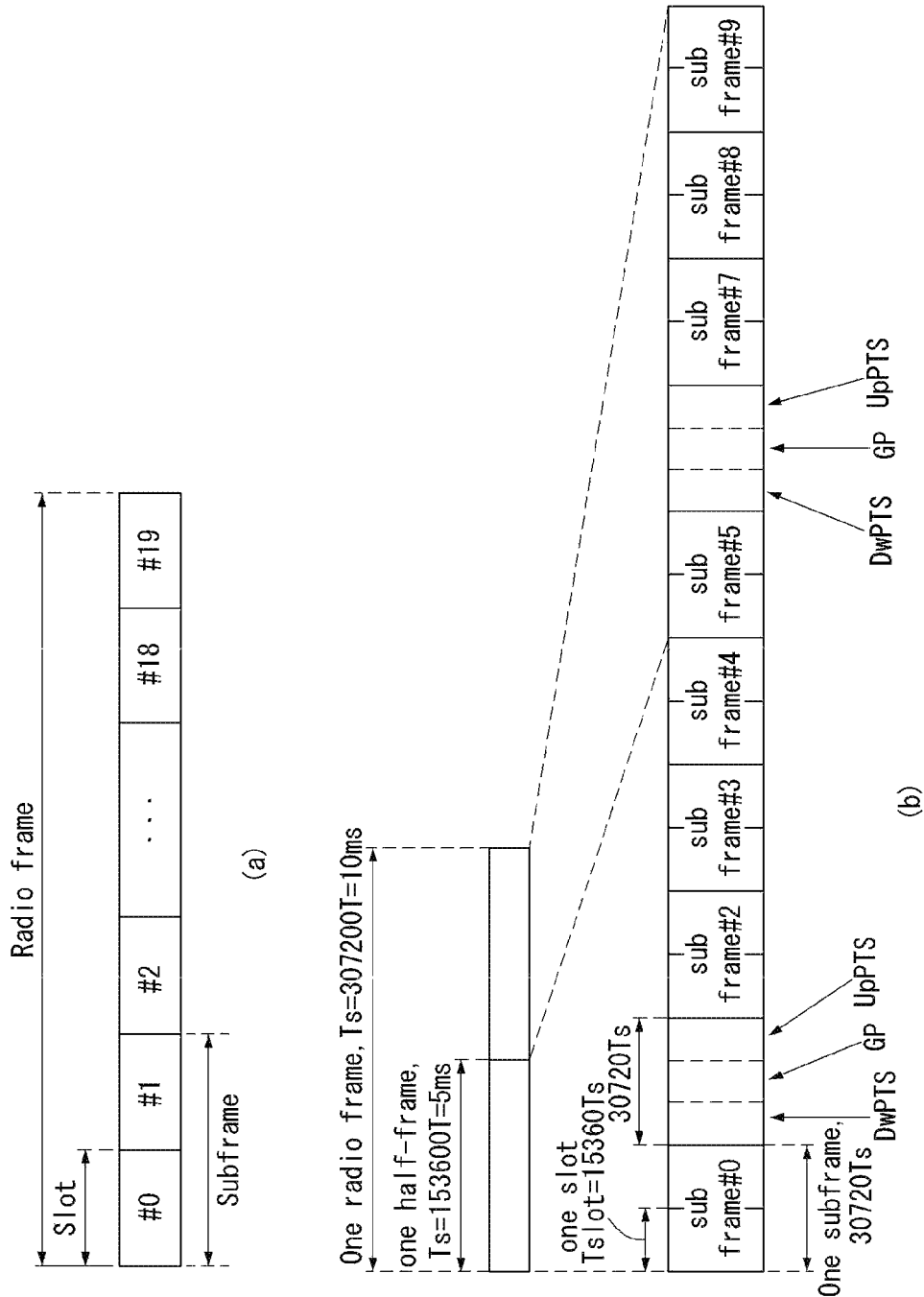
FIG. 1 shows the structure of a radio frame in a wireless communication system to which an embodiment of the present invention may be applied.

The above objects, characteristics, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. The same reference numerals basically designate the same elements throughout the drawings. In describing the present invention, a detailed description of known functions or elements related to the present invention will be omitted if it is deemed to make the gist of the present invention unnecessarily vague.

Hereinafter, methods and devices related to the present invention are described in more detail with reference to the accompanying drawings. It is to be noted that the suffixes of the elements used in the following description, such as "module" and "unit", are assigned or interchangeable with each other by taking only the ease of writing this specification into consideration, but in themselves are not particularly given importance and roles.

An electronic device described in this specification may include a mobile phone, a smart phone, a notebook, a terminal for digital broadcast, a Personal Digital Assistant (PDA), a Portable Multimedia Player (PMP), a navigator, to a name few. However, those skilled in the art to which the present invention pertains may easily understand that the construction according to an embodiment described in this specification may also be applied to fixed terminals, such as digital TV and desktop computers, other than the case where the construction can be applied to only a mobile terminal.

In general, an "eNB" used in this application refers to a fixed or mobile point communicating with UE and may be a term which collectively refers to a base station, a Node-B, an eNode-B, and a femto-cell.

In a mobile communication system, User Equipment (UE) may receive information from an eNB in downlink and transmit information in uplink. The information transmitted or received by the UE includes data and various types of control information. Various physical channels are present depending on the type of information transmitted or received by UE.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. LTE-Advanced (A) is an evolved version of 3GPP LTE.

Furthermore, specific terms used in the following description are provide to help understanding of the present invention, and the use of such a specific term may be changed in various forms without departing from the technical spirit of the present invention.

A signal used in an embodiment of the present invention may be transmitted in a frame form in addition to a message form.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | — | — | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

Figure 2:
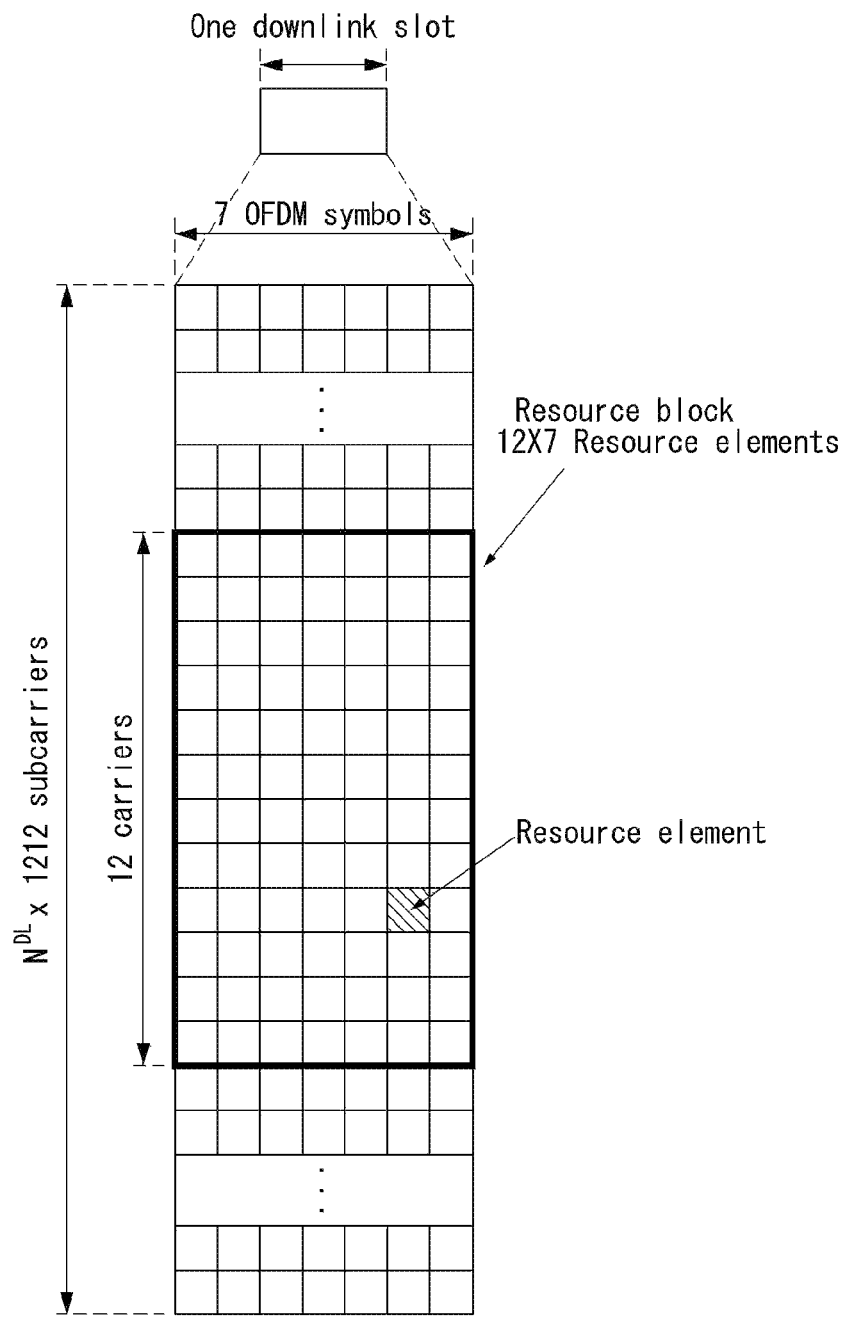
FIG. 2 is a diagram illustrating a resource grid for one downlink slot in a wireless communication system to which an embodiment of the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, $N^{DL}$ is subordinated to a downlink transmission bandwidth.

A structure of the uplink slot may be the same as that of the downlink slot.

Figure 3:
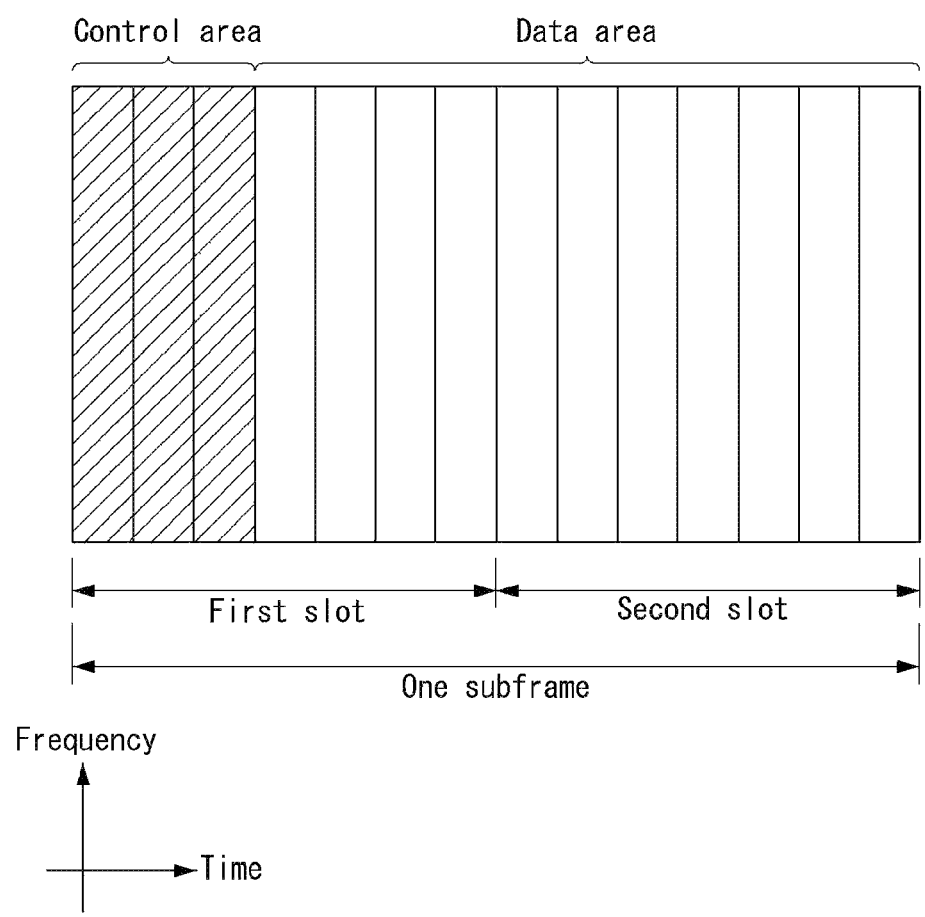
FIG. 3 shows the structure of a downlink subframe in a wireless communication system to which an embodiment of the present invention may be applied.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
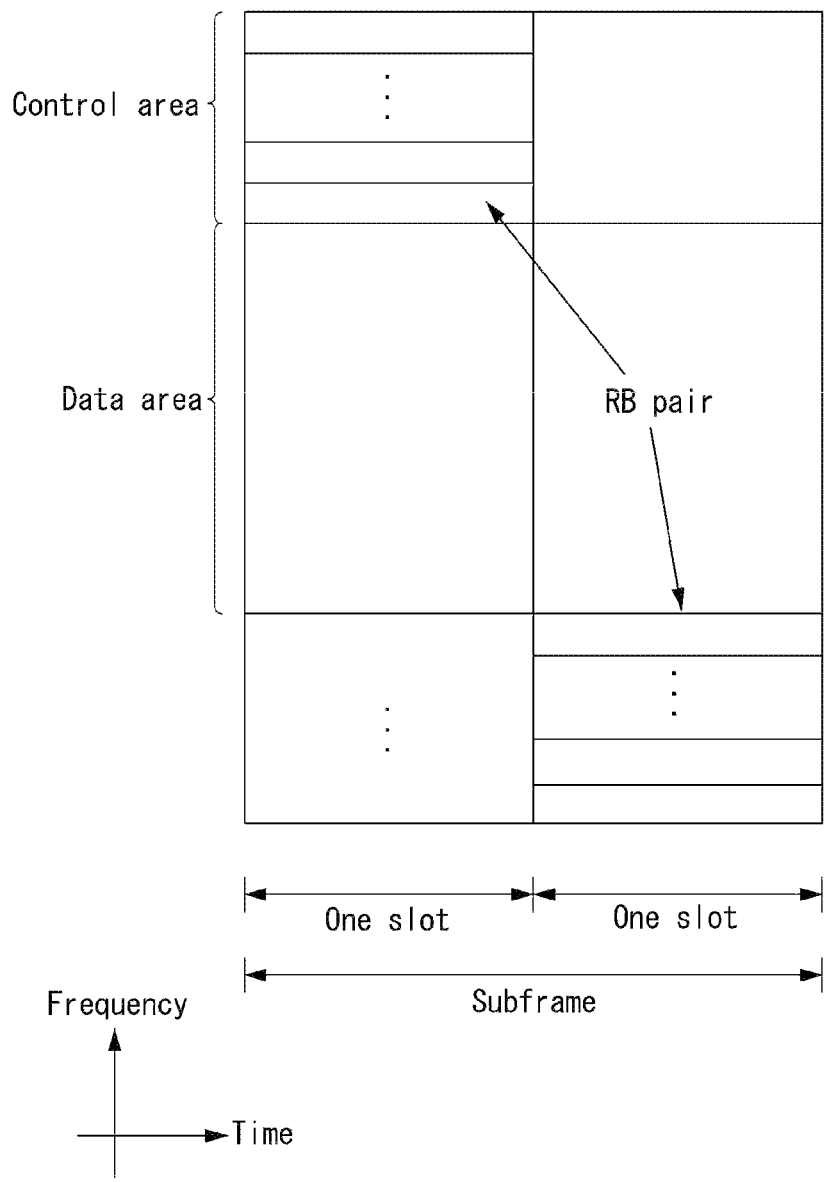
FIG. 4 shows the structure of an uplink subframe in a wireless communication system to which an embodiment of the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

General Contents of D2D Communication

In general, D2D communication is limitedly used as a term indicative of communication between things or thing intelligence communication. In an embodiment of the present invention, however, D2D communication may include all types of communication between a variety of types of devices having a communication function, such as a smart phone and a PC, in addition to a simple device having a communication function.

Figure 5:
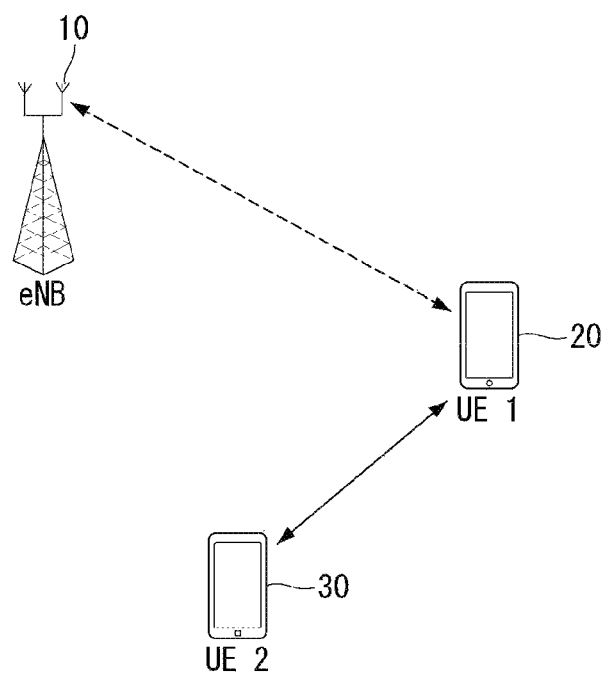
FIG. 5 is a diagram conceptually illustrating D2D communication.

FIG. 5 is a diagram conceptually illustrating D2D communication.

In an existing communication method based on an eNB, UE 1 20 may transmit data to an eNB 10 in uplink. The eNB may transmit data to UE 1 20 in downlink. Such a communication method may be called an indirect communication method through an eNB. In the indirect communication method, an Un link (i.e., a link between eNBs or a link between an eNB and a relay node, which may be referred to as a backhaul link), that is, a link defined in an existing wireless communication system, and/or an Uu link (i.e., a link between an eNB and UE or a link between a relay node and UE, which may be referred to as an access link) may be related.

FIG. 5 shows a UE-to-UE communication method, that is, an example of D2D communication, and shows that the exchange of data between pieces of UE may be performed without the intervention of an eNB. Such a communication method may be referred to as a direct communication method between devices. The D2D direct communication method has advantages in that latency is reduced and lesser radio resources are used compared with an existing indirect communication method through an eNB.

Figure 6:
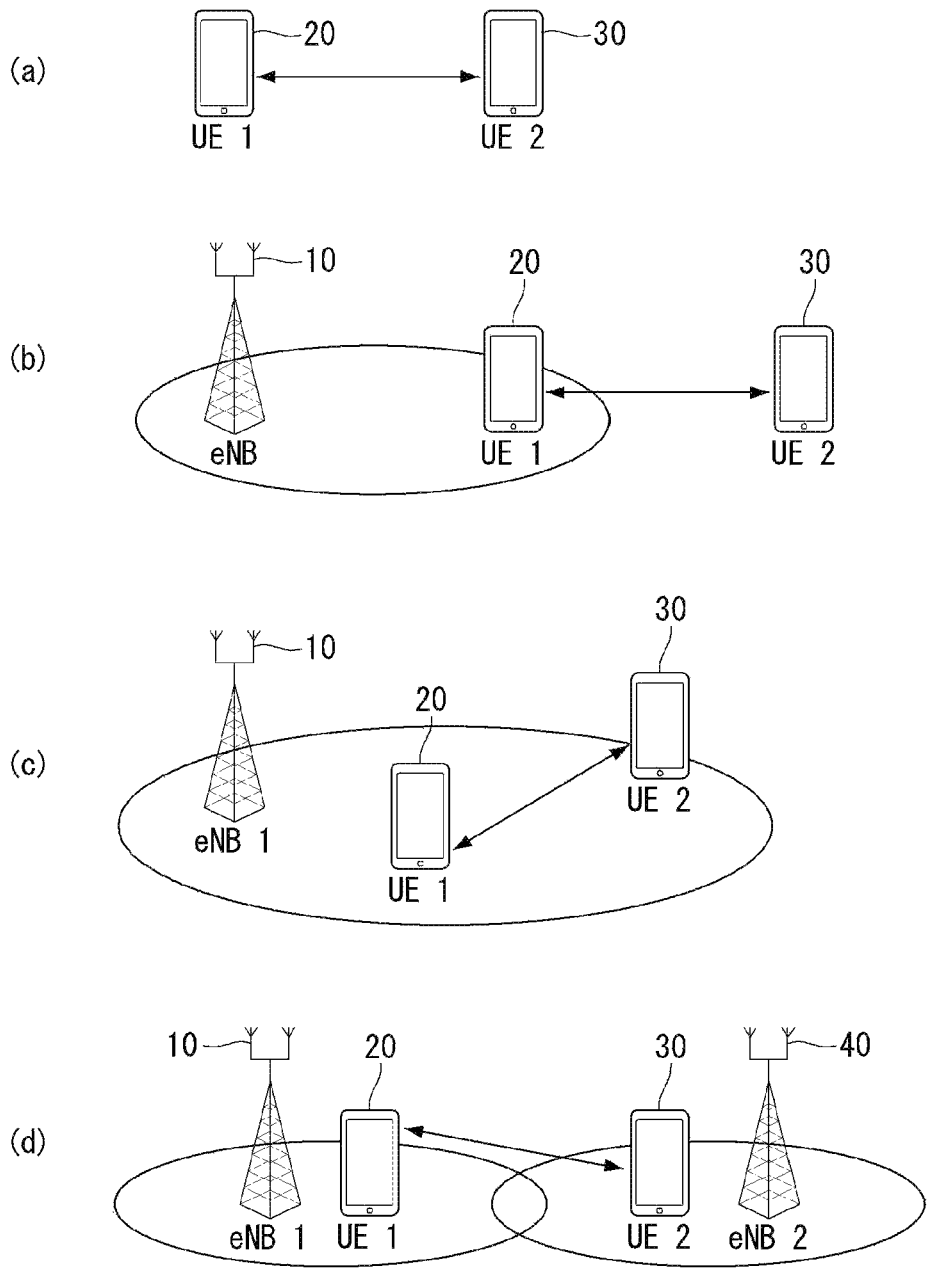
FIG. 6 is a diagram showing examples of various scenarios for D2D communication to which methods proposed according to embodiments of the present invention may be applied.

FIG. 6 is a diagram showing examples of various scenarios for D2D communication to which methods proposed according to embodiments of the present invention may be applied.

A scenario for D2D communication may be basically divided into (1) an out-of-coverage network, (2) a partial-coverage network, and (3) an in-coverage network depending on where UE 1 and UE 2 are placed within in-coverage and out-of-coverage.

The in-coverage network may be divided into an in-coverage-single-cell and an in-coverage-multi-cell depending on the number of cells corresponding to coverage of an eNB.

FIG. 6(a) shows an example of the out-of-coverage network scenario for D2D communication.

The out-of-coverage network scenario may show that D2D communication is performed between pieces of D2D UE without control of an eNB.

From FIG. 6(a), it may be seen that only UE 1 20 and UE 2 are present and they perform direct communication.

FIG. 6(b) shows an example of the partial-coverage network scenario for D2D communication.

The partial-coverage network scenario may show that D2D communication is performed between D2D UE placed within network coverage and D2D UE placed out of the network coverage.

From FIG. 6(b), it may be seen that UE 1 20 placed within network coverage and UE 2 30 placed out of the network coverage perform communication with each other.

FIG. 6(c) shows an example of the in-coverage-single-cell scenario, and FIG. 6(d) shows an example of the in-coverage-multi-cell scenario.

The in-coverage network scenario may show that pieces of D2D UE perform D2D communication with each other through control of an eNB within network coverage.

In FIG. 6(c), UE 1 20 and UE 2 30 are placed within the same network coverage (or cell) and perform D2D communication with each other under the control of an eNB.

In FIG. 6(d), UE 1 20 and UE 2 30 are placed within network coverage, but are placed within different pieces of network coverage. Furthermore, the UE 1 20 and the UE 2 30 perform D2D communication with each other under the control of respective eNBs managing network coverage.

D2D communication is described in more detail below.

D2D communication may be performed according to the scenarios of FIG. 6, but may be commonly performed within network coverage (i.e., the in-coverage) and out of network coverage (i.e., the out-of-coverage). A link used for D2D communication (i.e., direct communication between pieces of UE) may be referred to as a "D2D link", a "directlink", or a "sidelink", but is hereinafter generally referred to as a "sidelink", for convenience of description.

Sidelink transmission may be performed in an uplink spectrum in the case of FDD and may be performed in an uplink (or downlink) subframe in the case of TDD. Time Division Multiplexing (TDM) may be used for the multiplexing of sidelink transmission and uplink transmission.

Sidelink transmission and uplink transmission are not performed at the same time. Sidelink transmission is not generated in a sidelink subframe which partially or generally overlaps an uplink subframe or UpPTS used for uplink transmission. Furthermore, the transmission and reception of sidelinks are also not generated at the same time.

The structure of an uplink physical resource and the structure of a physical resource used for sidelink transmission may be identically used. However, the last symbol of a sidelink subframe includes a guard period and is not used for sidelink transmission.

A sidelink subframe may include an extended Cyclic Prefix (CP) or a normal CP.

D2D communication may be basically divided into discovery, direct communication, and synchronization.

1) Discovery

D2D discovery may be applied within network coverage (including an inter-cell and an intra-cell). In inter-cell discovery, both synchronous and asynchronous cell deployments may be taken into consideration. D2D discovery may be used for various commercial purposes, such as advertising, issuing coupons, and finding friends, with respect to UE within a proximity region.

If the UE 1 20 functions to transmit a discovery message, the UE 1 20 transmits a discovery message, and the UE 2 30 receives the discovery message. The transmission and reception roles of the UE 1 20 and the UE 2 30 may be changed.

Transmission from the UE 1 20 may be received by one or more pieces of UE, such as the UE 2 30.

The discovery message may include a single MAC PDU. In this case, the single MAC PDU may include a UE ID and an application ID.

A physical sidelink discovery channel (PSDCH) may be defined as a channel for transmitting a discovery message. The structure of a PUSCH may be reused as the structure of the PSDCH.

Two types, that is, Type 1 and Type 2, may be used as a resource allocation method for D2D discovery.

In Type 1, an eNB may allocate resources for transmitting a discovery message in a non-UE-specific way.

Specifically, a radio resource pool for discovery transmission and reception, including a plurality of subframes, is allocated in a specific cycle. Discovery transmission UE randomly selects a specific resource within the radio resource pool and then transmits a discovery message.

Such a periodic discovery resource pool may be semi-statically allocated in order to transmit a discovery signal. Information about the configuration of the discovery resource pool for discovery signal transmission includes a discovery cycle and the number of subframes (i.e., the number of subframes forming the radio resource pool) which may be used to transmit a discovery signal within the discovery cycle.

In the case of in-coverage UE, a discovery resource pool for discovery transmission may be configured by an eNB, and the in-coverage UE may be notified of the configured discovery resource pool through RRC signaling (e.g., a System Information Block (SIB)).

A discovery resource pool allocated for discovery within one discovery cycle may be TDM- and/or FDM-multiplexed as a time-frequency resource block having the same size. Such a discovery resource pool may be referred to as a "discovery resource."

A discovery resource may be used for a single piece of UE to transmit a discovery MAC PDU. The transmission of the MAC PDU transmitted by the single piece of UE may be repeated within a discovery cycle (i.e., a radio resource pool) continuously or discontinuously (e.g., four times). UE may randomly select a first discovery resource in a discovery resource set which may be used for the repetitive transmission of an MAC PDU. The remaining discovery resources may be determined in relation to the first discovery resource.

For example, a specific pattern may be previously determined, and a next discovery resource may be determined according to the predetermined specific pattern depending on the position of a discovery resource first selected by UE. Furthermore, the UE may randomly select each discovery resource within a next discovery resource set which may be used for the repetitive transmission of an MAC PDU.

In Type 2, resources for discovery message transmission are allocated in a UE-specific way. Type 2 is subdivided into Type-2A and Type-2B. Type-2A is a method of allocating, by an eNB, a resource at the instance at which UE transmits a discovery message within a discovery cycle, and Type-2B is a method of allocating resources semi-persistently.

In Type-2B, RRC_CONNECTED UE requests an eNB to allocate a resource for the transmission of a D2D discovery message through RRC signaling. Furthermore, the eNB may allocate the resource through RRC signaling. When the UE switches to an RRC IDLE state or when the eNB withdraws resource allocation through RRC signaling, the UE releases the most recently allocated transmission resource. As described above, in Type-2B, a radio resource may be allocated through RRC signaling, and the activation/deactivation of the allocated radio resource may be determined by a PDCCH.

A radio resource pool for receiving a discovery message may be configured by an eNB, and UE may be notified of the configured radio resource pool through RRC signaling (e.g., a System Information Block (SIB)).

UE that receives a discovery message monitors both the aforementioned discovery resource pools of Type 1 and Type 2 in order to receive a discovery message.

2) Direct Communication

The region to which D2D direct communication is applied includes a network coverage edge area (i.e., edge-of-coverage) in addition to inside and outside network coverage (i.e., in-coverage and out-of-coverage). D2D direct communication may be used for purposes, such as Public Safety (PS).

If UE 1 has a role of direct communication data transmission, the UE 1 transmits direct communication data, and UE 2 receives the direct communication data. The transmission and reception roles of the UE 1 and the UE 2 may be changed. The direct communication transmission from the UE 1 may be received by one or more pieces of UE, such as the UE 2.

D2D discovery and D2D communication are not associated with each other, but may be independently defined. That is, in groupcast and broadcast direct communication, D2D discovery is not required. If D2D discovery and D2D direct communication are independently defined as described above, pieces of UE do not need to perceive adjacent UE. In other words, in the case of groupcast and broadcast direct communication, all reception pieces of UE within a group are not required to be adjacent to each other.

A physical sidelink shared channel (PSSCH) may be defined as a channel for transmitting D2D direct communication data. Furthermore, a physical sidelink control channel (PSCCH) may be defined as a channel for transmitting control information (e.g., Scheduling Assignment (SA) and a transmission format for direct communication data transmission) for D2D direct communication. The structure of a PUSCH may be reused as the structures of the PSSCH and the PSCCH.

Two types of mode 1 and mode 2 may be used as a resource allocation method for D2D direct communication.

Mode 1 refers to a method of scheduling, by an eNB, data for D2D direct communication by UE or a resource used for UE to transmit control information. Mode 1 is applied to in-coverage.

An eNB configures a resource pool for D2D direct communication. In this case, the resource pool for D2D communication may be divided into a control information pool and a D2D data pool. When an eNB schedules control information and a D2D data transmission resource within a pool configured for transmission D2D UE using a PDCCH or ePDCCH, the transmission D2D UE transmits control information and D2D data using the allocated resource.

Transmission UE requests a transmission resource from an eNB. The eNB schedules a resource for transmitting control information and D2D direct communication data. That is, in the case of mode 1, the transmission UE needs to be in the RRC_CONNECTED state in order to perform D2D direct communication. The transmission UE transmits a scheduling request to the eNB, and a Buffer Status Report (BSR) procedure is performed so that the eNB may determine the amount of resources requested by the transmission UE.

Pieces of reception UE monitor a control information pool. When decoding control information related to the reception UE, the reception UE may selectively decode D2D data transmission related to corresponding control information. The reception UE may not decode a D2D data pool based on the results of the decoding of the control information.

Mode 2 refers to a method of randomly selecting, by UE, a specific resource in a resource pool in order to transmit data or control information for D2D direct communication. Mode 2 is applied to the out-of-coverage and/or the edge-of-coverage.

In Mode 2, a resource pool for transmitting control information and/or a resource pool for transmitting D2D direct communication data may be pre-configured or may be semi-statically configured. UE is supplied with a configured resource pool (time and frequency), and it selects a resource for D2D communication transmission in the resource pool. That is, the UE may select a resource for control information transmission in a control information resource pool in order to transmit control information. Furthermore, the UE may select a resource in a data resource pool in order to transmit D2D direct communication data.

In D2D broadcast communication, control information is transmitted by broadcasting UE. Control information is explicitly and/or implicitly indicative of the position of a resource for data reception in relation to a physical channel (i.e., a PSSCH) on which D2D direct communication data is carried.

3) Synchronization

A D2D synchronization signal (or a sidelink synchronization signal) may be used for UE to obtain time-frequency synchronization. In particular, since control of an eNB is impossible in the case of out-of-network coverage, a new signal and procedure for establishing synchronization between pieces of UE may be defined.

UE which periodically transmits a D2D synchronization signal may be referred to as a D2D synchronization source. If a D2D synchronization source is an eNB, a transmitted D2D synchronization signal may have the same structure as a PSS/SSS. If a D2D synchronization source is not an eNB (e.g., UE or a Global Navigation Satellite System (GNSS)), the structure of a transmitted D2D synchronization signal may be newly defined.

A D2D synchronization signal is periodically transmitted in a cycle not less than 40 ms. UE may have multiple physical layer sidelink synchronization identities. A D2D synchronization signal includes a primary D2D synchronization signal (or a primary sidelink synchronization signal) and a secondary D2D synchronization signal (or a secondary sidelink synchronization signal).

UE may search for a D2D synchronization source before it transmits a D2D synchronization signal. Furthermore, when the D2D synchronization source is searched for, the UE may obtain time-frequency synchronization through a D2D synchronization signal received from the retrieved D2D synchronization source. Furthermore, the UE may transmit a D2D synchronization signal.

In D2D communication, direct communication between two devices is described below as an example, for clarity, but the scope of the present invention is not limited thereto. The same principle described in an embodiment of the present invention may be applied to D2D communication between a plurality of two or more devices.

A method for forming a cluster between pieces of UE by taking into consideration the locations of pieces of UE and allocating a D2D resource set to each cluster in a D2D network environment proposed according to an embodiment of the present invention is described below with reference to FIGS. 7 and 8.

Figure 7:
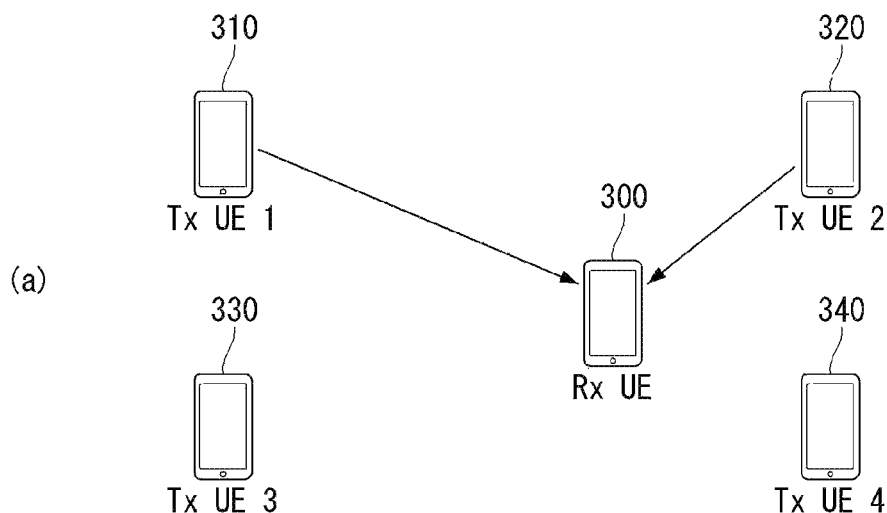
FIG. 7 is a diagram showing an example of a method for allocating D2D resources in D2D network, which is proposed according to an embodiment of the present invention.
Figure 7:
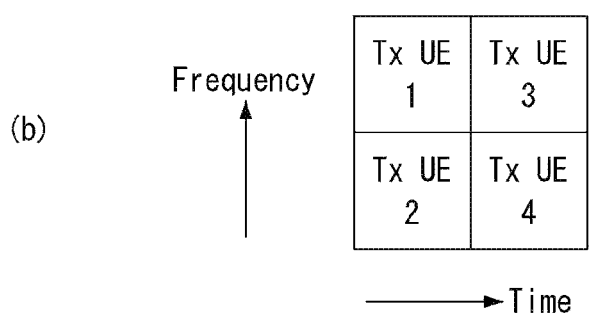

FIG. 7 is a diagram showing an example of a method for allocating D2D resources in D2D network, which is proposed according to an embodiment of the present invention.

More specifically, FIG. 7(a) shows an example of a D2D network including a plurality of pieces of transmission UE and one piece of reception UE, and FIG. 7(b) shows an example in which D2D resources are allocated to pieces of UE using an FDM method. The resource structure of FIG. 7(b) shows a D2D resource transmission unit. The D2D resource transmission unit shows a resource region used for D2D communication.

Furthermore, the D2D resource transmission unit may include a D2D signal transmission area and a D2D signal reception area and include at least D2D resource set.

The D2D resource set may be indicative of a D2D resource group which may be allocated for each cluster and may include at least one D2D resource.

In this case, the D2D resource may be a minimum unit which may be allocated to pieces of UE.

Furthermore, the D2D resource set may include a specific number of subframes and a specific number of Resource Blocks (RB).

The cluster is indicative of a set of pieces of UE including at least piece of UE.

In the D2D network environment of FIG. 7(a), if D2D transmission resources are allocated to pieces of transmission UE (hereinafter referred to as "Tx UE") as in FIG. 7(b), interference may be generated in reception UE (hereinafter referred to as "Rx UE") 300.

That is, when the pieces of Tx UE transmit signals using different frequency resources in the same time resource region, interference may be generated due to the difference between signal intensities according to the distance. The D2D resource may be a unit resource forming the D2D resource set.

In D2D communication, clusters may use different resource sets partitioned in a specific size in order to avoid a resource collision against an adjacent cluster.

If D2D resources are allocated to pieces of UE using a TDM method, perfect orthogonalization may be performed between the D2D resources allocated to the pieces of UE.

If D2D resources are allocated to pieces of UE using a Frequency Division Multiplexing (FDM) method in the same time domain, however, interference attributable to in-band emission may be generated.

As shown in FIG. 7(b), D2D resources partitioned using an FDM method are allocated to Tx UE 1 310 and Tx UE 2 320, respectively.

In this case, when receiving a signal transmitted by the Tx UE 1 310, Rx UE 300 is greatly influenced by in-band emission attributable to a signal transmitted by the Tx UE 2 320.

When the Rx UE 300 receives a signal transmitted by the Tx UE 2 320, however, the Rx UE 300 experiences in-band emission attributable to a signal transmitted by the Tx UE 1 310, but the influence is not great.

Accordingly, if Tx UE close to Rx UE and Tx UE relatively distant from the Rx UE are subjected to TDM multiplexing on the same time and different frequency resources are allocated to the pieces of Tx UE, a near-far problem may be generated.

A method for solving the near-far problem described with reference to FIG. 7 is described in detail below with reference to FIG. 8.

Figure 8:
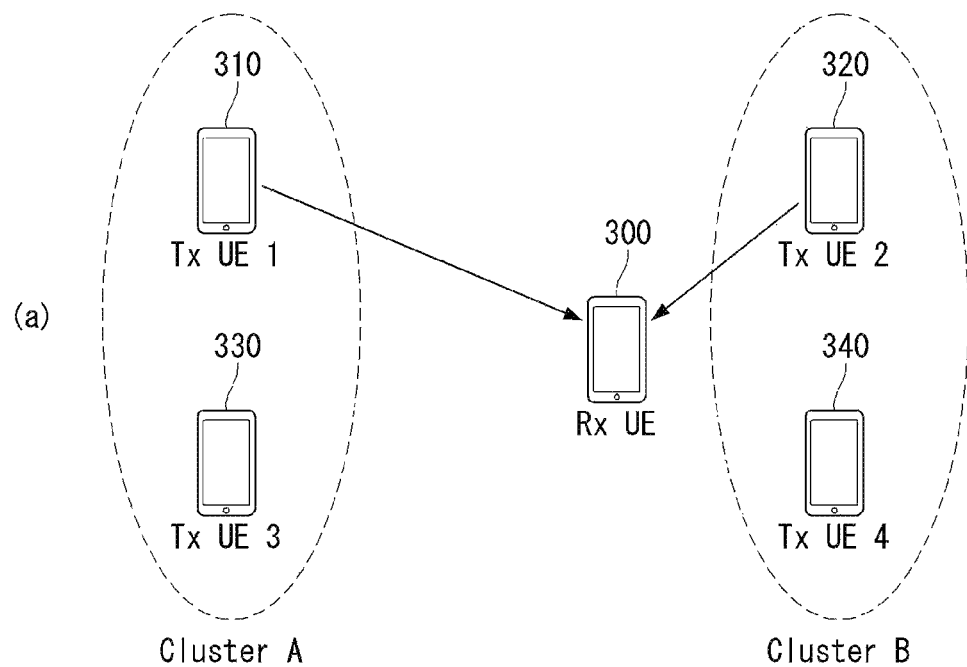
FIG. 8 shows an example of a method for forming a cluster by taking into consideration the locations of pieces of UE and allocating a D2D resource set for each cluster using a TDM method, which is proposed according to an embodiment of the present invention.
Figure 8:
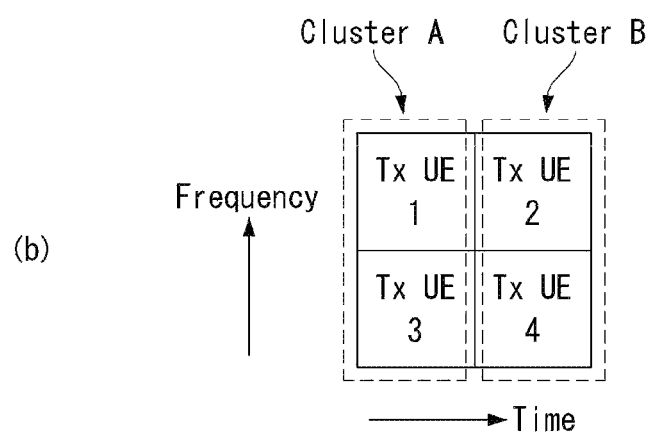

FIG. 8 shows an example of a method for forming a cluster by taking into consideration the locations of pieces of UE and allocating a D2D resource set for each cluster using a TDM method, which is proposed according to an embodiment of the present invention.

Referring to FIG. 8, if pieces of adjacent Tx UE form one cluster and a D2D resource set is allocated for each cluster using a Time Division Multiplexing (TDM) method, the influence of in-band emission described with reference to FIG. 7 can be reduced.

More specifically, as shown in FIG. 7(b), if a resource set is allocated to a cluster including Tx UE relatively distant from the Rx UE 300 and Tx UE relatively close to the Rx UE 300 using a TDM method, in-band emission may be generated due to the difference in the distance between the pierces of Tx UE within the same cluster because resources are allocated to the pieces of Tx UE within the same cluster using a Frequency Division multiplexing (FDM) method.

Accordingly, in order to reduce such in-band emission, pieces of adjacent Tx UE may form one cluster as shown in FIG. 8(a). For example, Tx UE 1 310 and adjacent Tx UE 3 330 may form one cluster A, and Tx UE 2 320 and adjacent Tx UE 4 340 may form the other cluster B.

If resource sets for D2D communication are allocated to the cluster A and the cluster B using a TDM method according to the aforementioned method, the influence of in-band emission attributable to the difference in the distance between Tx UE and Rx UE 300, that is, Rx UE, can be reduced because the Tx UE 1 310 and the Tx UE 3 330 are adjacent to each other and the distance to the Rx UE 300 is similar.

In this case, resources may be allocated to the pieces of Tx UE included in the cluster A and the cluster B using a Frequency Division Multiplexing (FDM) method.

Figure 9:
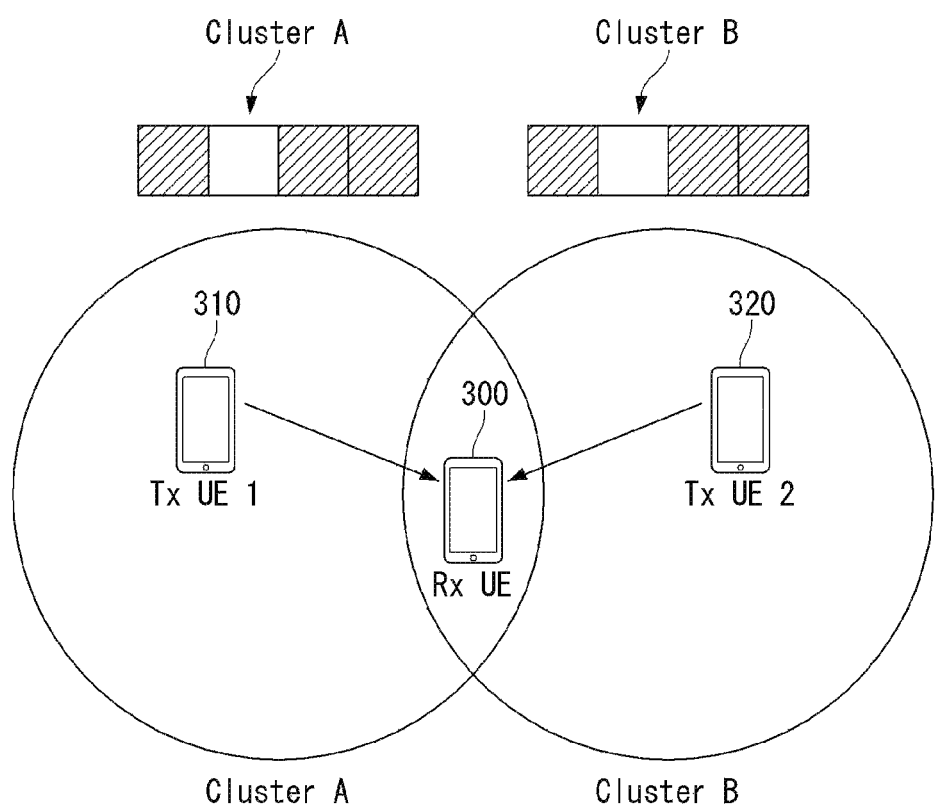
FIG. 9 is a diagram showing an example in which interference is generated between clusters in D2D communication.

FIG. 9 is a diagram showing an example in which interference is generated between clusters in D2D communication.

From FIG. 9, it may be seen that if clusters use the same D2D resource set because they do not share D2D resource information, Rx UE placed at a cluster boundary receives signals transmitted by clusters on both sides through the same D2D resource.

A resource allocation method for D2D communication and an example in which interference is generated according to the resource allocation method are described in detail below.

Resource Allocation for D2D Communication

Resource allocation for D2D communication may be divided into two types. In one type, D2D UE is present within an in-coverage area. In the other type, D2D UE is present within an out-of-coverage area.

As described with reference to FIG. 6, ☐ the in-coverage area refers to an area within the cell radius of an eNB, and ☐ the out-of-coverage area refers to an area outside the cell radius of an eNB.

☐ If the header of a cluster is present in the in-coverage area, an eNB or relay UE schedules a resource set for D2D data or control information transmission. The scheduled resource information is transmitted to the header cluster, and pieces of D2D UE within the cluster may use the resource set scheduled by the eNB or the relay UE.

☐ If the cluster header is present in the out-of-coverage area, the cluster header may receive specific resource allocation information from adjacent clusters or may autonomously determine a resource set through energy detection for each resource set.

In FIG. 9, if a resource set is allocated to Tx UE 1 310, that is, Tx UE of a cluster A, and Tx UE 2 320, that is, Tx UE of a cluster B, using one of the aforementioned two methods, the Tx UE 1 310 and the Tx UE 2 320 may transmit D2D data or control information to Rx UE 300, that is, Rx UE, using the allocated resource sets.

In this case, if a resource allocation information or signal is not received from an adjacent cluster or whether a resource set is used is not detected through energy detection, the cluster A and the cluster B may use the same resource set in an overlap manner.

In particular, there is a problem in that the Rx UE 300 receiving signals at the cluster boundary may receive a signal which may function as interference in addition to a required signal.

Furthermore, there is a great burden on pieces of the Rx UE 300 which need to monitor signals transmitted by a plurality of clusters because the pieces of Rx UE 300 have to track all of pieces of timing of a plurality of clusters.

A method for configuring resources through cooperation between clusters and a method for sharing timing information between clusters in order to solve such a problem are described below.

Figure 10:
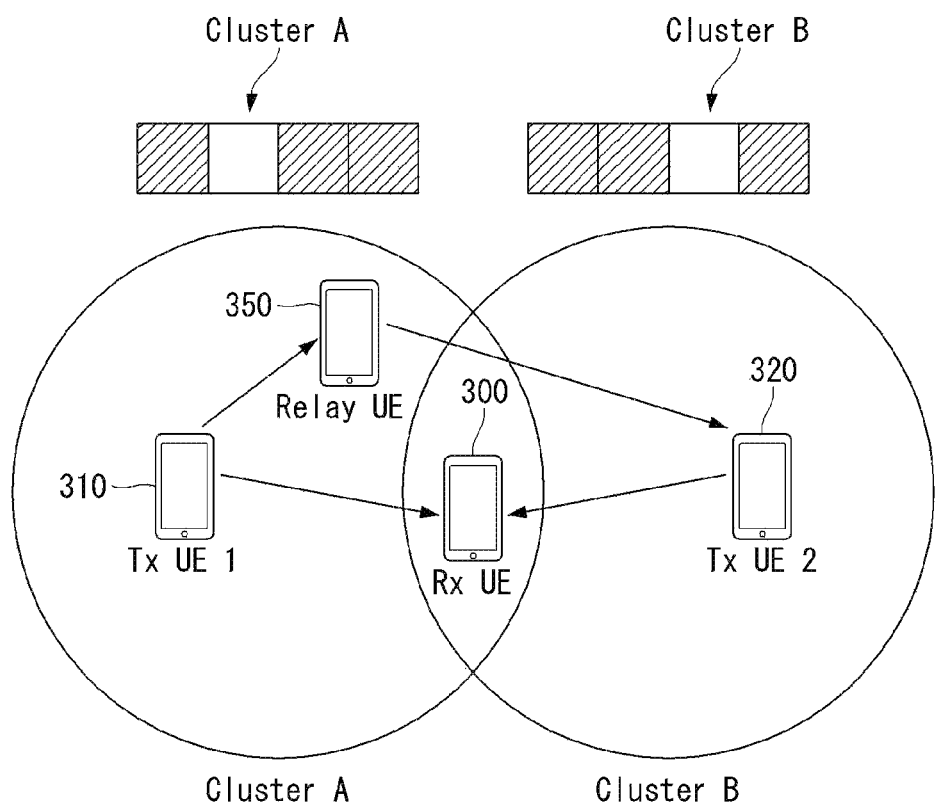
FIG. 10 is a diagram showing an example of a resource allocation method in D2D communication to which an embodiment of the present invention may be applied.

FIG. 10 is a diagram showing an example of a resource allocation method in D2D communication to which an embodiment of the present invention may be applied.

Referring to FIG. 10, if resource allocation information and/or timing information are shared between clusters using relay UE, the clusters can be prevented from using the same D2D resource set. Each of the clusters may include one or more pieces of relay UE.

More specifically, in FIG. 10, relay UE 350 present in a cluster A may obtain timing information for D2D communication synchronization from a cluster header (or UE capable of providing the timing reference of a cluster, such as sync reference UE of a cluster) like other pieces of UE within the cluster A.

Furthermore, the relay UE 350 may obtain information about resources or a resource set used by Tx UE 1 310, that is, Tx UE within the cluster A.

The relay UE 350 may transfer the obtained resource allocation information and/or timing information to Tx UE 2 320 within an adjacent cluster B or another D2D relay UE.

In this case, the relay UE 350 may transfer the obtained resource allocation information and/or timing information through one hopping operation or multiple hopping operations depending on a signal transmission range.

The resource allocation information and/or timing information is hereinafter referred to as "specific information."

The Tx UE 2 320 that has received specific information from the relay UE 350 may check the received specific information and select a resource set different from that of the Tx UE 1 310. Accordingly, the cluster A and the cluster B may select their resource sets using such a method so that the resource sets do not overlap.

Clusters that have receive specific information through relay UE may share all of pieces of resource allocation information and/or timing information of the clusters associated with the relay UE.

A set of the clusters sharing the resource allocation information and/or timing information may be defined as a super cluster.

The size of the super cluster is determined by a hopping count through the relay UE. Accordingly, a maximum hopping count may be previously defined in order to prevent the size of the super cluster from being excessively increased.

Each cluster may form one tier based on each hopping count. That is, a main cluster triggering hopping may form a 0-th tier, clusters receiving a first relay may form a first tier, and clusters receiving a next relay may form a second tier.

In FIG. 10, a main cluster is the cluster A. The cluster A may form a 0-th tier, and the cluster B receiving a first relay may form a first tier.

The maximum hopping count may be a previously defined value or may be set through a high layer signal, such as RRC. The maximum hopping count may be included in a physical layer signal, for example, a D2D Synchronization Signal (D2DSS) or Physical D2D Synchronization Signal (PD2DSCH) used for synchronization in a D2D system and transmitted to each cluster.

UE that becomes the reference of synchronization timing of a cluster that has attempted the first relay may be hereinafter referred to as Super cluster Synchronization Reference UE (SSR-UE).

The relay UE 350 may transmit the specific information, for example, information about the cluster A, that is, a cluster to which the relay UE 350 belongs, and/or information related to a relay to another piece of relay UE or the header of a next cluster through a preset specific channel (e.g., a PD2DSCH) while performing a relay operation. Such a specific channel is hereinafter referred to as a "relaying channel."

The specific information transmitted through the relaying channel may include at least one of the index of a cluster that has initially started the relay, the index of a cluster header, the ID of the relay UE 350, information related to a hopping count, and information related to a resource set (i.e., at least one of information about all of resource set configurations for each hopping count or tier, a resource set used in a current tier, and information related to a resource set to be used in a next tier).

The header of a specific cluster may select or determine a resource set to be used through the relayed specific information or automatically (in this case, reads a hopping count value) through such a method.

In the selection or determination of the resource set, the location (i.e., a resource set number) of a resource to be used in each tier is configured using a previously defined value or through a high layer signal, such as RRC.

The set resource set number may be included in a physical layer signal, for example, in a D2D Synchronization Signal (D2DSS) or a Physical D2D Synchronization Channel (PD2DSCH) in a D2D system and transferred.

For example, if a resource transmission unit for transmitting D2D data or control information is divided into four resource sets and a maximum hopping count is 3, a main cluster corresponding to a 0-th hopping may select a 0-th resource set and a cluster corresponding to the final third hopping may select a third resource set based on a hopping count value.

If a method, such as that of FIG. 10, is used, clusters may not select resource sets in an overlap manner. There is an advantage in that interference can be reduced because a plurality of clusters transmits signals to the Rx UE 300 through different D2D resources.

The aforementioned specific information and relaying channel may be used as the same meanings in the following embodiments.

Figure 11:
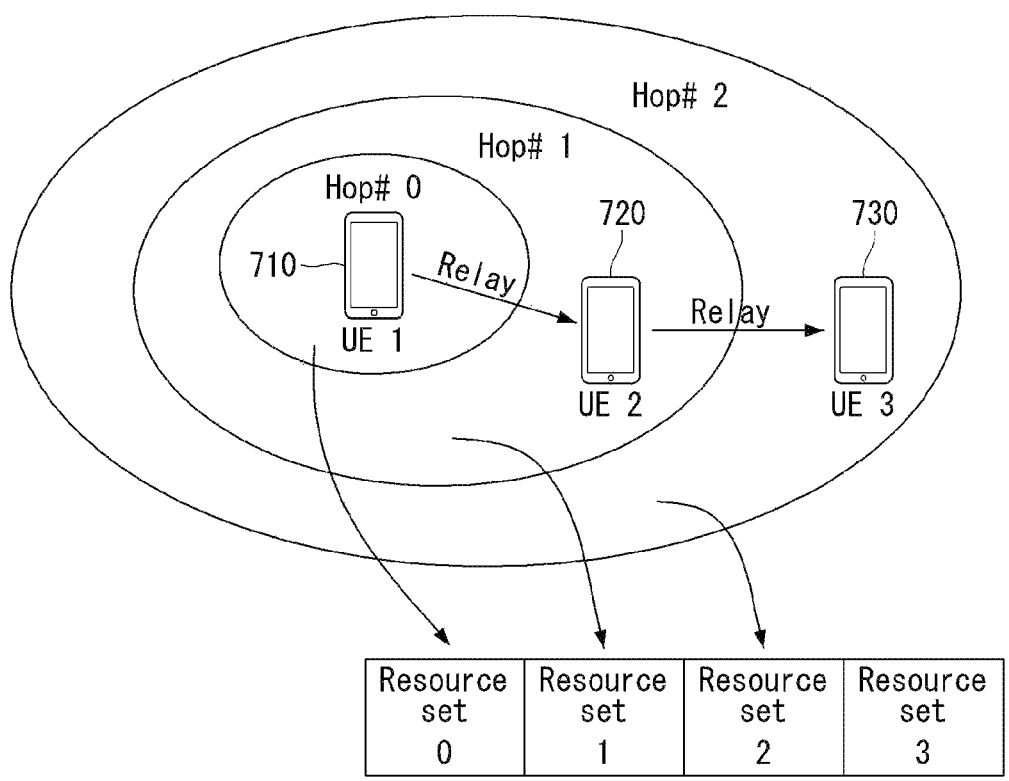
FIG. 11 is a diagram showing an example of a relay method when relay UE receives a plurality of pieces of resource allocation information to which an embodiment of the present invention may be applied.

FIG. 11 is a diagram showing an example of a relay method when relay UE receives a plurality of pieces of resource allocation information to which an embodiment of the present invention may be applied.

Referring to FIG. 11, if the header of a cluster receives specific information from pieces of relay UE or headers of a plurality of clusters belonging to different tiers, the relay UE or header of a specific cluster may relay only specific information transmitted through a relaying channel.

This is described in detail. UE 2 720, that is, relay UE or a cluster header, may receive specific information through UE 1 710, that is, the relay UE or cluster header of a previous tier. In this case, the UE 2 720 may receive another piece of specific information from UE 5 750 belonging to the cluster of a tier different from the tier of the UE 1 710.

In this case, the UE 2 720 may transmit the specific information, transmitted by the UE 1 710 or the UE 5 750, to the header of a next cluster by relaying the specific information through the following method.

First, the UE 2 720 may receive specific information through a relaying channel having the highest signal intensity based on the intensity (e.g., power or a Signal to Noise Ratio (SNR)) of a transmitted signal and relay the received specific information.

The UE 2 720 may determine the intensity of a relay signal received from the UE 1 710 or the UE 5 750 by taking into consideration the Signal to Noise Ratio (SNR), bandwidth, and power of the relay signal.

Thereafter, the UE 2 720 may select the specific information received from the UE 1 710 or the UE 5 750 based on the determined signal intensity and perform a relay operation.

In this case, the UE 1 710, the UE 2 720, and the UE 5 750 are cluster headers representative of respective clusters. A signal intensity received by each of such cluster headers may be an important reference for determining a relaying channel.

That is, a relay signal having the most reliable signal intensity may be selected because a relay signal received with low signal intensity does not have a great influence and also has low reliability, and a relay operation may be performed.

Second and third methods are described assuming that signal intensity described in the first method is a specific reference value or more. In this case, the reference value may be a previously defined value or may be set through a high layer signal, such as RRC. The reference value may be included in a physical layer signal, for example, in a D2D Synchronization Signal (D2DSS)/a Physical D2D Synchronization Channel (PD2DSCH) in a D2D system and transferred.

Second, a signal having the smallest hopping count value may be selected, and a relay operation may be performed. That is, the UE 2 720 may select a signal having the smallest hopping count value based on a signal received from the UE 1 710 or the UE 5 750 and transmit the selected signal to the cluster header or relay UE of a next tier.

The second method may be applied if there is no problem although several steps of hopping are performed, for example, if resources are sufficient because the number of resources sets subjected to Time Division Multiplexing (TDM) is too many or coverage of a super cluster is to be extended to a maximum extent.

Third, a signal having the greatest hopping count value may be selected and relayed. That is, the UE 2 720 may select a signal having the greatest hopping count value based on a signal received from the UE 1 710 or the UE 5 750 and transmit the selected signal to another piece of relay UE or cluster header of a next tier through a relay operation.

The third method may be applied if a relay needs to be early terminated by reducing a hopping steps, for example, if resources are not sufficient because the number of resources sets subjected to Time Division Multiplexing (TDM) is too small or coverage does not need to be extended.

Figure 12:
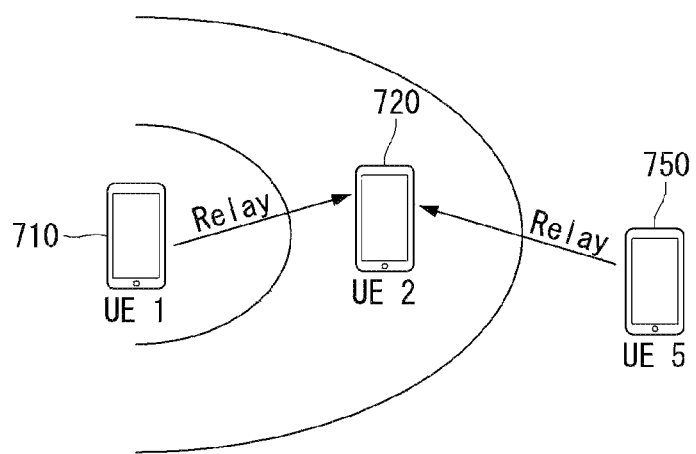
FIG. 12 is a diagram showing an example of a method for transmitting resource allocation information to which an embodiment of the present invention may be applied.

FIG. 12 is a diagram showing an example of a method for transmitting resource allocation information to which an embodiment of the present invention may be applied.

Referring to FIG. 12, if clusters are present in an in-coverage area, a resource set may be configured by taking into consideration multiplexing between a D2D signal and cellular signals in addition to multiplexing between D2D signals.

More specifically, UE 1 710, that is, the header of a cluster or relay UE, and UE 2 720 may be present within the cell coverage area of an eNB (not shown), that is, an eNB, and UE 3 730 may be present outside the cell coverage area of the eNB.

The UE 1 710 may transmit and receive data and control information to and from the eNB. In this case, if a resource set used by the UE 1 710 or the UE 2 720 within the cell coverage area for D2D communication and a resource set used by the eNB for a cellular uplink signal are the same, a collision may be generated between the signal for D2D communication and the cellular uplink signal.

Accordingly, the resource set allocated for the cellular uplink transmission may be excluded when a D2D resource set is configured by taking into consideration such a collision.

For example, if the eNB uses a resource set 2 for cellular uplink in FIG. 12, the UE 1 710 and the UE 2 720 may receive a resource set other than the resource set 2 and perform D2D communication.

The resource set may be allocated to the header of each cluster through a relay method described in an embodiment of the present invention.

However, in the case of a cluster present in the out-of-coverage area, if there is no influence or interference with cellular uplink transmission, the cluster may use the same resource set as a resource set used for cellular uplink.

That is, if a cluster including the UE 3 730 is present outside the cell coverage area of the eNB 10 and does not influence the transmission of cellular uplink or the influence is weak, the UE 3 730 may select and use a resource set 2 being used by the eNB 10 for cellular uplink or may perform D2D communication.

Figure 13:
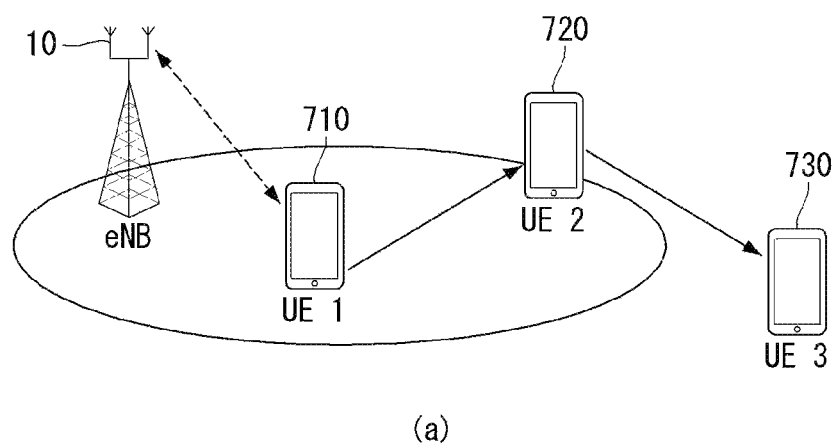
FIGS. 13 and 14 are diagrams showing an example of a resource allocation method through relaying in D2D communication to which an embodiment of the present invention may be applied.
Figure 14:
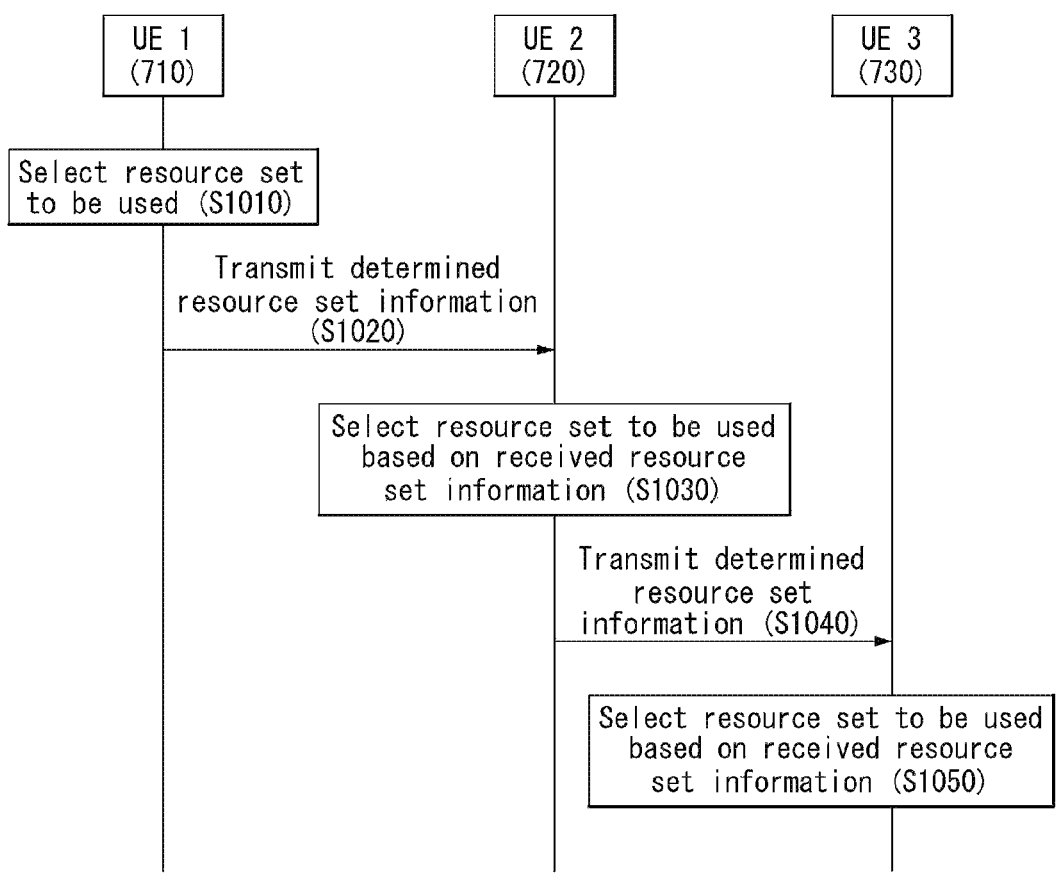

FIGS. 13 and 14 are diagrams showing an example of a resource allocation method through relaying in D2D communication to which an embodiment of the present invention may be applied.

Hereinafter, UE 1 710, UE 2 720, and UE 3 730 may function as cluster headers or pieces of relay UE representative of respective specific clusters. Furthermore, the cluster to which the UE 1 710 belongs may be the main cluster of a super cluster to which the clusters of the UE 2 720 and the UE 3 730 belong.

The UE 1 710, the UE 2 720, and the UE 3 730 may perform a relay operation in order to allocate resources through cooperation with the respective clusters. One or more pieces of relay UE may be present inside/outside each of the clusters for the relay operation.

In order to allocate a resource set, the UE 1 710 may use a predetermined resource set configuration as described with reference to FIG. 10 or the UE 1 710 may directly select an optimal resource set.

If a resource set used in the main cluster is determined by the UE 1 710, the clusters belonging to the remaining tiers may configure resource sets to be used in association with the determined resource set.

For example, if the cluster header of a 0-th tier (including the main cluster) selects a k-th resource set, the cluster header of an n-th tier may select resources using a result value of Equation 1.

$$(K+n) \bmod K \qquad \text{[Equation 1]}$$

Equation 1 shows the remaining value obtained by dividing a (k+n) value by K. In this case, k may have a value of 0~K−1, and K is a total count of a resource set. n may have a value between 0~N−1, and N−1 means a total hopping count.

That is, if a total count of a resource set is 3 and the cluster header of the 0-th tier selects a No. 1 resource set, the cluster header of a third tier may select a No. 0 resource set, that is, a (3+¼)-th resource set.

In some embodiments, a resource set to be used in an n-th cluster may be determined using a resource number selected by the header of the main cluster and a hopping count value.

That is, the relay UE of the main cluster may map the value of a resource set to be selected based on a hopping count to a preset specific channel (e.g., a PD2DSCH), may send the value of the resource set, and may continue to relay the value of the resource set.

Referring to FIGS. 13 and 14, as described above, the UE 1 710, that is, the header of the main cluster, may select a resource set 0 for D2D communication at step S1010. The UE 1 710 that has selected the resource set 0 may transmit specific information (described with reference to FIG. 6), indicating that the resource set 0 has been selected by the UE 1 710, to the UE 2 720, that is, the cluster header of a next tier, through a relaying channel at step S1020.

In this case, the UE 1 710 may transmit the specific information to relay UE. The relay UE may transmit the received specific information to the UE 2 720, that is, the cluster header of the next tier.

The UE 2 720 may select a resource set to be used in the cluster to which the UE 2 720 belongs based on the received specific information. In this case, in order to select the resource set, the UE 2 720 may use the method of Equation 1 at step S1030.

Thereafter, the UE 2 720 may include information about the selected resource set in the specific information and transmit the specific information to the UE 3 730, that is, the cluster header of a next tier, at step S1040. Like the UE 2 720, the UE 3 730 may select a resource set for D2D communication at step S1050. In this case, the UE 3 730 may select a resource set 2.

In this case, the UE 2 720 may transmit the specific information to the UE 3 730, that is, the relay UE or cluster header of a next tier.

The headers of the clusters may directly select the resource sets to be used in their clusters through such a method.

Each of the UE 1 710, the UE 2 720, and the UE 3 730, that is, respective cluster headers, may receive the specific information from the cluster header of a previous tier and may receive the specific information through relay UE.

Figure 15:
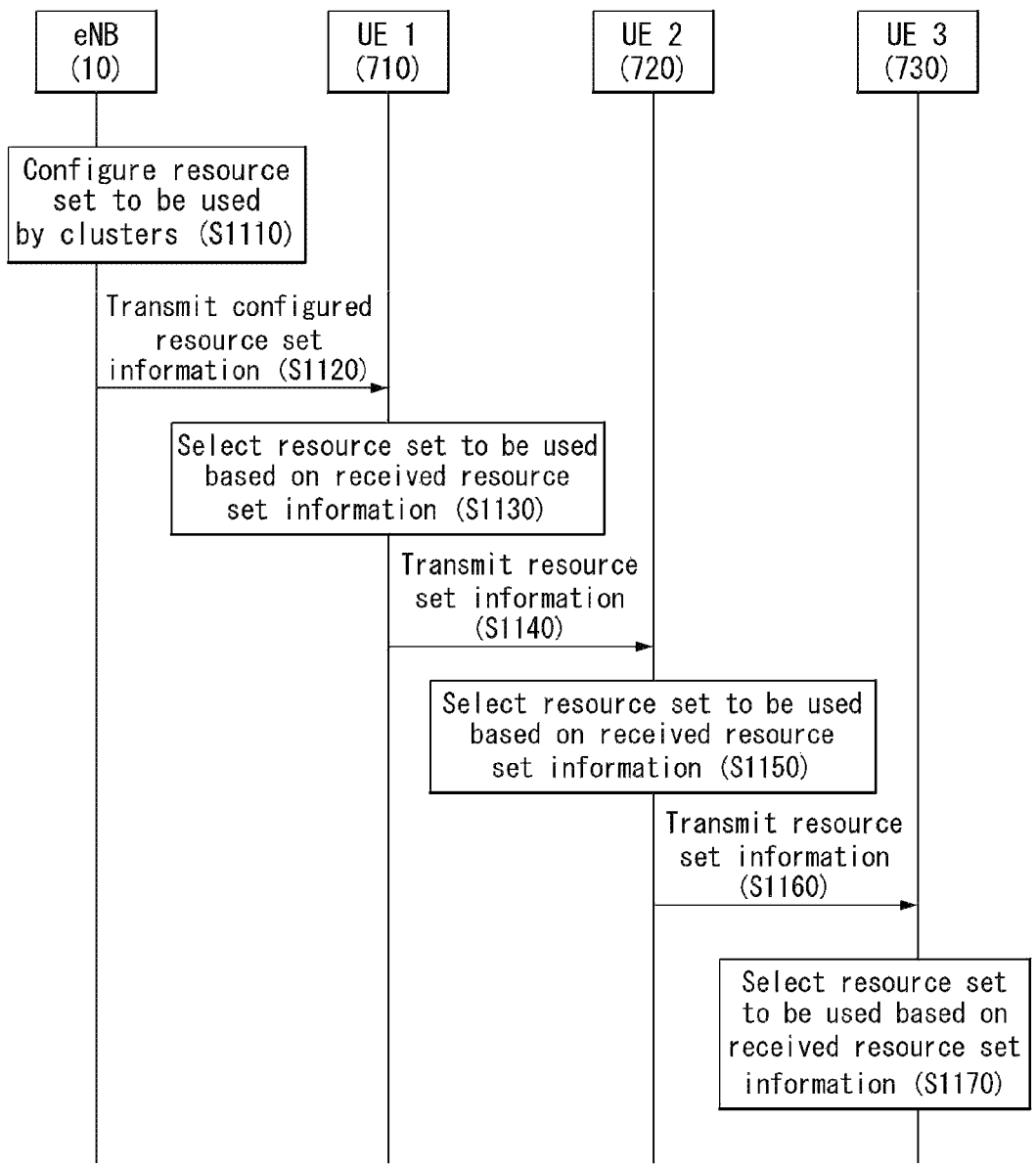
FIGS. 15 and 16 are diagrams showing methods for determining, by an eNB or a main cluster, a resource set to be used by each cluster.
Figure 16:
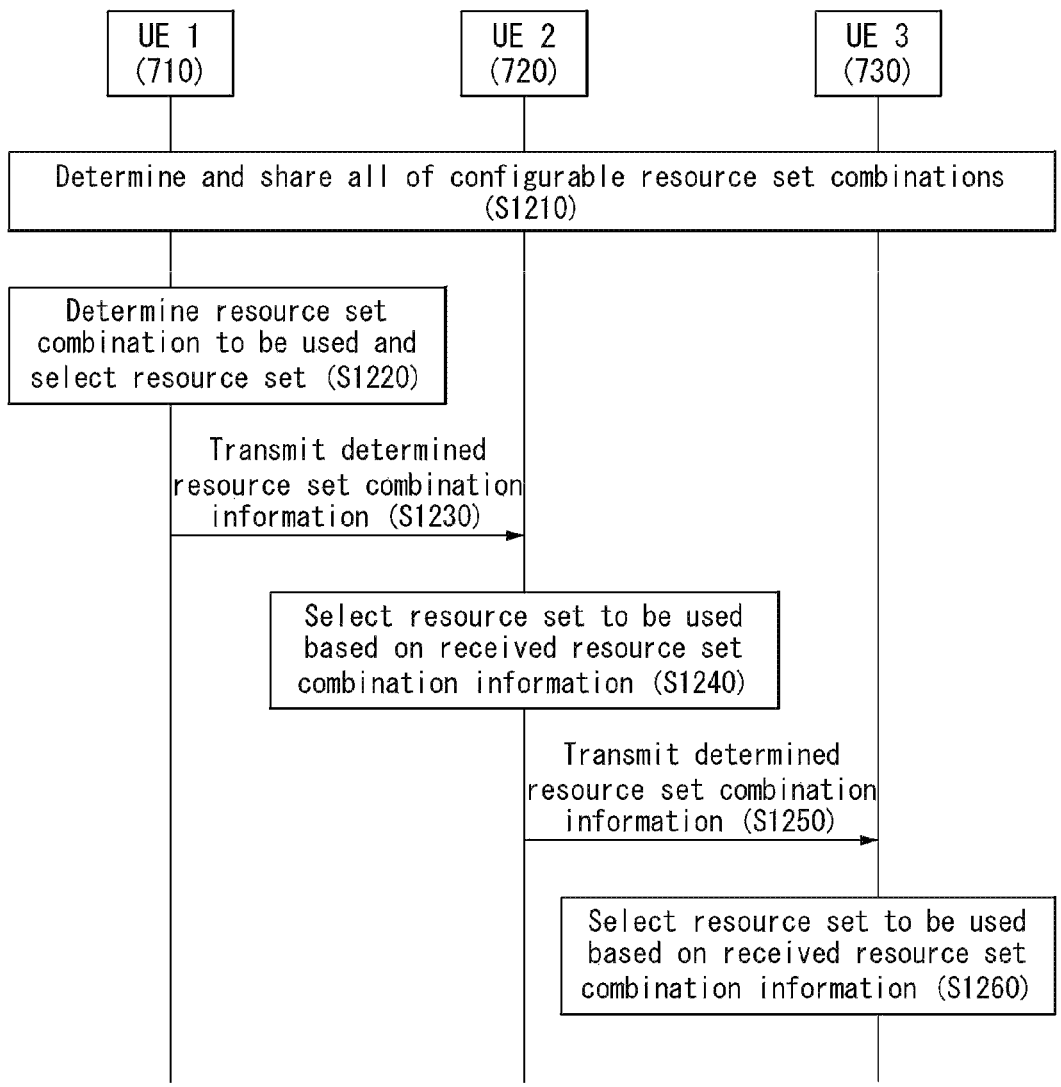

FIGS. 15 and 16 are diagrams showing methods for determining, by an eNB or a main cluster, a resource set to be used by each cluster.

Referring to FIG. 15, an eNB may determine a resource set to be used by the cluster of each tier, and the header of each cluster or relay UE may transfer information about the determined resource set configuration to the cluster header or relay UE of a next tier through a relay operation.

More specifically, if four resource sets may be allocated, an eNB of a cell to which a main cluster belongs, that is, an eNB 1 10 to which the UE 1 710 belongs, may configure resource set configurations to be used by the respective clusters like {0, 1, 2, 3} at step S1110.

In this case, if a total number of available resource sets is K and a total hopping count is N−1, a bitmap required to represent a combination of all of the resource set configurations may be represent using Equation 2 below.

$$N \times \mathrm{ceil}\{\log_2 K\} \qquad \text{[Equation 2]}$$

The ceil function used in Equation 2 means a function for rounding off to the nearest whole number. For example, if K=4 and N=4, a bitmap required to represent a combination of the resource set configurations is 8 and may be represented like 11011000. The bitmap mapped like 11011000 may be construed like {11, 01, 10, 00} (binary) or {3, 1, 2, 0} (decimal).

The eNB 10 may transmit information about the set resource set configurations to the UE 1 710, that is, the header of a main cluster at step S1020. The UE 1 710 may select a resource set to be used based on the information received from the eNB 10 at step S1130. For example, if the resource set is configured like {0, 1, 2, 3} as described above, the UE 1 710 may select the resource set 0.

The UE 1 710 that has selected the resource set may transmit information related to the resource set configuration received from the eNB 10 or the specific information to the UE 2 720, that is, the cluster header of a next tier, through a relaying channel at step S1140. The UE 2 720 may select a resource set to be used in the cluster to which the UE 2 720 belongs based on the received information at step S1150.

Thereafter, the UE 2 720 may transmit information related to the resource set configuration or the specific information to the UE 3 730, that is, the cluster header of a next tier, through the relaying channel at step S1160. Like the UE 2 720, the UE 3 730 may select a resource set to be used in the cluster to which the UE 3 730 belongs based on the received information and use the selected resource set at step S1170.

The header UE of each cluster may directly transmit the specific information to the cluster header of a next tier through the relay operation and also transmit the specific information to relay UE. The relay UE that has received specific information may transmit the specific information to the cluster header of a next tier through a relay operation.

Unlike in FIG. 15, in FIG. 16, resource set information configured by an eNB or a main cluster may be previously shared between clusters, and a resource set to be used may be selected based on the shared resource set information.

This is described in detail in the case of out-of-coverage. The UE 1 710, that is, the cluster header of the main cluster, may determine a combination related to a plurality of resource set configurations to be used by clusters. All of the clusters may share the combination at step S1210.

For example, if a combination of the resource set configurations is limited to 8 types, such as {0, 1, 2, 3}, {1, 2, 3, 0}, {2, 3, 1, 0}, {3, 0, 1, 2,}, {3, 2, 1, 0}, {0, 3, 2, 1}, {1, 0, 3, 2}, and {2, 1, 0, 3}, (only the amount of 3-bit information is required), information about the 8 resource sets may be previously defined and shared between the clusters of a super cluster.

The UE 1 710 may select a resource set configuration for cluster resource allocation from a combination of the shared 8 resource set configurations and may select a resource set based on the selected resource set configuration.

For example, the UE 1 710 may select the third resource set configuration of the 8 resource set configurations. In this case, the UE 1 710 may select a second resource set based on {2, 3, 1, 0}, that is, the third resource set configuration, and perform D2D communication.

Thereafter, the UE 1 710, that is, the header of the main cluster, may transmit information about the selected resource set configuration to the UE 2 720, that is, the cluster header of a next tier, through a relaying channel at step S1230. The UE 2 720 selects the third resource set configuration of the resource set combination based on the number of the resource set configuration and uses the third resource set at step S1240.

Like the UE 1 710, the UE 2 720 transmits the number of the resource set configuration to the UE 3 730, that is, the cluster header of the next tier of the UE 2 720, at step S1250. The UE 3 730 uses a third element of the shared resource set combination, that is, a first resource set, based on the number of the resource set configuration at step S1260.

In the methods described with reference to FIGS. 17 to 20, a rule by which a specific resource set is used in a specific hopping count or a specific tier has been previously defined.

Such a method is advantageous in that it is simple and convenient because a predetermined rule is used to determine a resource set, but affects a next cluster if the predetermined rule or a resource set configuration is not properly received or received with an erroneous value.

Furthermore, an interference situation may differently appear for each cluster. Such a method has a problem in that such a situation is not incorporated. A method for solving such a problem is described below.

Figure 17:
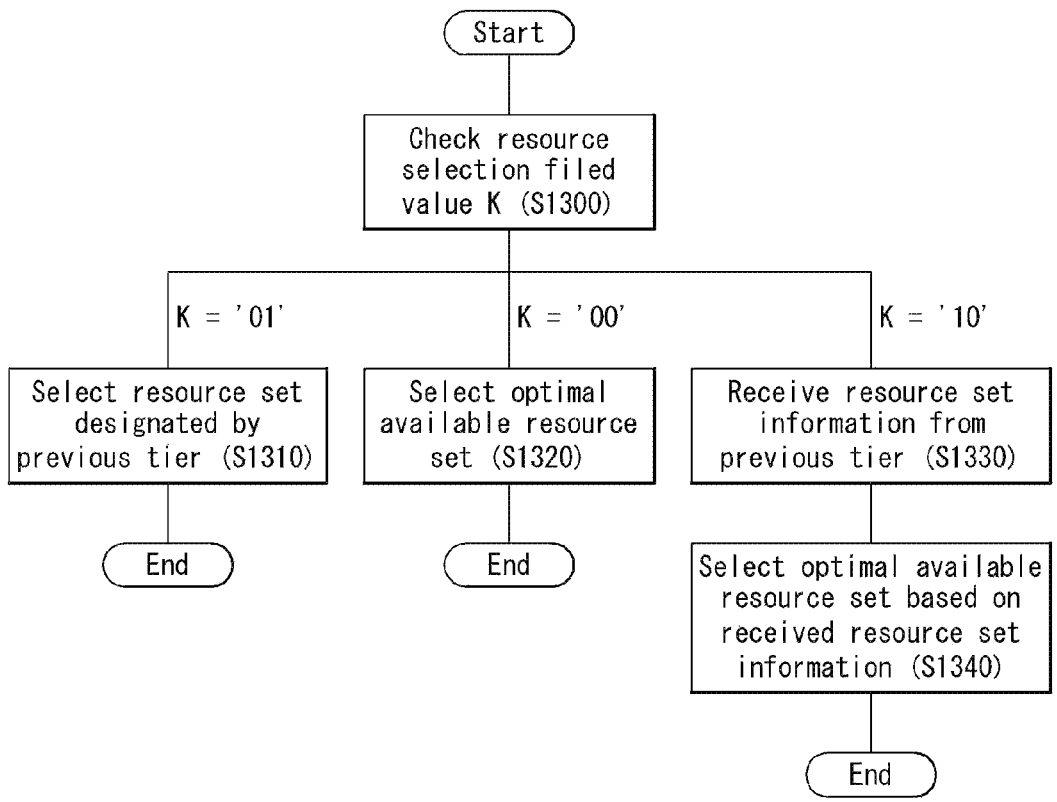
FIG. 17 is a flowchart illustrating an example of a method capable of flexibly selecting a resource set to which an embodiment of the present invention is applied.

FIG. 17 is a flowchart illustrating an example of a method capable of flexibly selecting a resource set to which an embodiment of the present invention is applied.

Referring to FIG. 17, each cluster may select a resource set through a different method based on the field value of a relaying channel.

More specifically, the value of a specific field (e.g., a resource selection method) may be placed in a relaying channel, and a different method for selecting a resource set may be performed based on the value. The header of a cluster (or relay UE) may check the value of a specific field (hereinafter referred to as "K") of the relaying channel at step S1300.

If, as a result of the check, the K value is found to be "01", the header of the cluster uses a resource set designated by the cluster header of a previous tier at step S1310. If, as a result of the check, the K value is found to be "00", the cluster header may select an optimal resource set that may be directly used at step S1320.

If the K value is "01", the header of the cluster may receive information related to a resource set configuration or specific information from a previous tier at step S1330 and directly select an optimal resource set that may be used based on the information related to the resource set configuration or the specific information at step S1340.

Each of the methods is described in detail below.

Determination and Transmission of Resource Set to be Used in Next Tier

Figure 18:
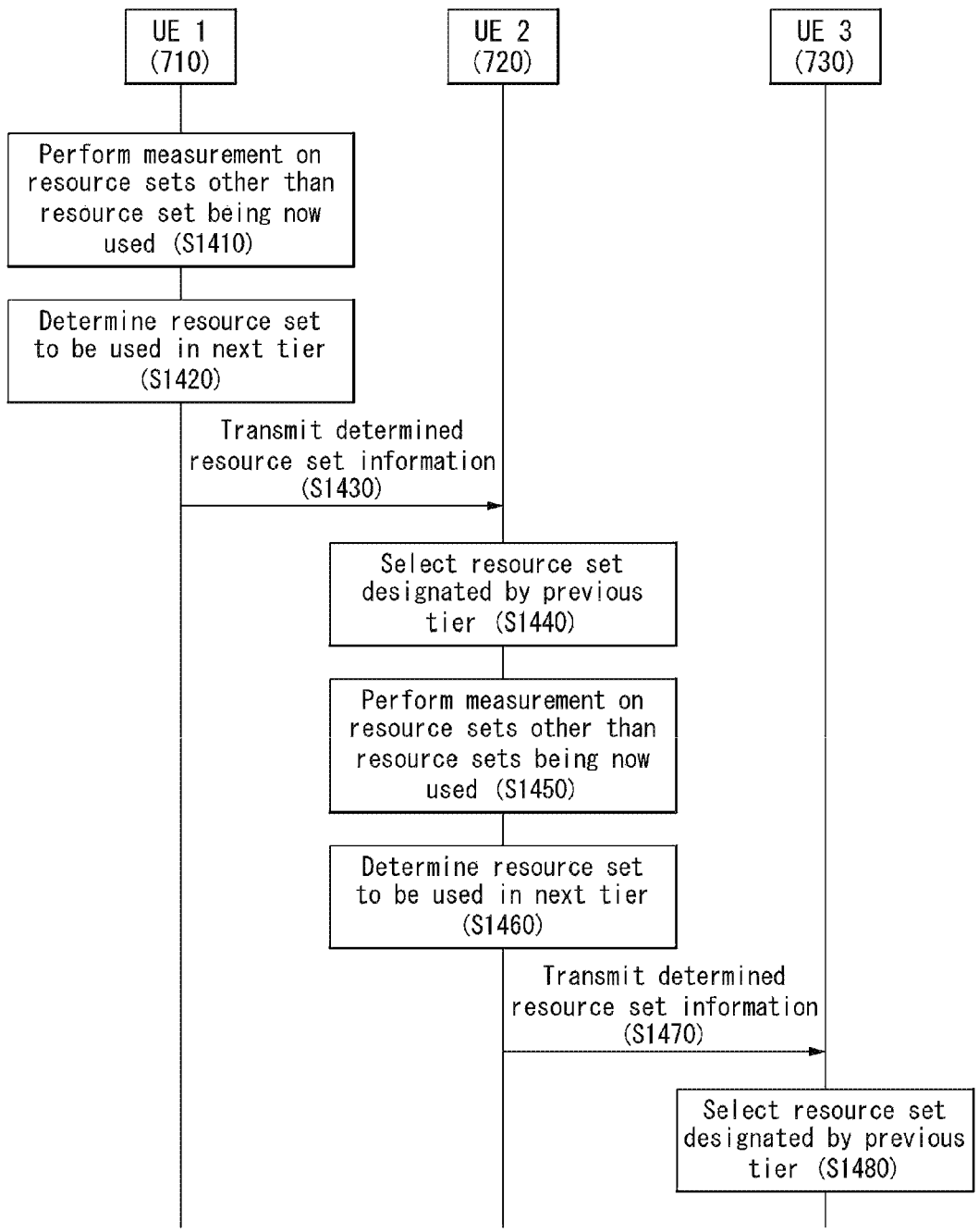
FIG. 18 is a diagram showing an example of a method for flexibly determining, by a cluster, a resource set to which an embodiment of the present invention may be applied.

FIG. 18 is a diagram showing an example of a method for flexibly determining, by a cluster, a resource set to which an embodiment of the present invention may be applied.

Referring to FIG. 18, the header of each cluster may directly determine a resource set to be used in a next tier. The cluster header of the next tier may perform D2D communication through the determined resource set.

More specifically, if the value of a specific field (e.g., resource selection method) of a relaying channel is "01", UE 1 710, that is, the header of a main cluster, may perform measurement on the remaining available resource sets other than a resource set used in the cluster to which the UE 1 710 belongs at step S1410.

The UE 1 710 may measure the Signal to Noise Ratio (SNR) or Signal to Interference plus Noise Ratio (SINR) of a resource set that may be allocated through the measurement. In addition, the UE 1 710 may measure various values in order to select an optimal resource set.

Thereafter, the UE 1 710 determines a resource set to be used in the cluster of a next tier based on the measured value at step S1420 and transmits information about the determined resource set to relay UE or UE 2 720, that is, the cluster header of a next tier, through the relaying channel at step S1430.

The UE 2 720 may perform D2D communication using a resource set determined by the UE 1 710. Like the UE 1 710; the UE 2 720 may perform measurement on resource sets not used by the UE 1 710 and the UE 2 720 because the value of the specific field of the relaying channel is "01" at step S1450.

The UE 2 720 determines an optimal resource set to be used by UE 3 730, that is, the cluster header of a next tier, based on the results of the measurement at step S1460 and transmits information about the determined resource set to relay UE or the UE 3 730 through the relaying channel at step S1470.

The UE 3 730 selects a resource set based on the information about the resource set determined by the UE 2 720 and performs D2D communication at step S1480.

Each cluster header may determine a resource set to be used in each cluster most accurately. If each cluster header receives information related to a resource set from the cluster of a previous tier and determine the resource set, it may be a burden on the cluster header in terms of a delay or complexity. Accordingly, it may be effective if the cluster header of a right-before tier directly determines a resource set to be used by the cluster of a next tier and transmits the value of the determined resource set to the UE 2 720.

Determination of Resource Set to be Used by Current Tier

If a resource set to be used in the cluster of a current tier is determined in the cluster of a previous tier, complexity in the determination of a resource set can be reduced, but may remain intact because an operation for determining a resource to be used in the cluster of a next tier needs to be identically performed from the nature of a relay operation.

Accordingly, if an operation for determining a resource set needs to be performed, it may be efficient to directly determine a resource set to be used in the cluster of a current tier rather than determining a resource set to be used in the cluster of a next tier. Such a method is described below.

Figure 19:
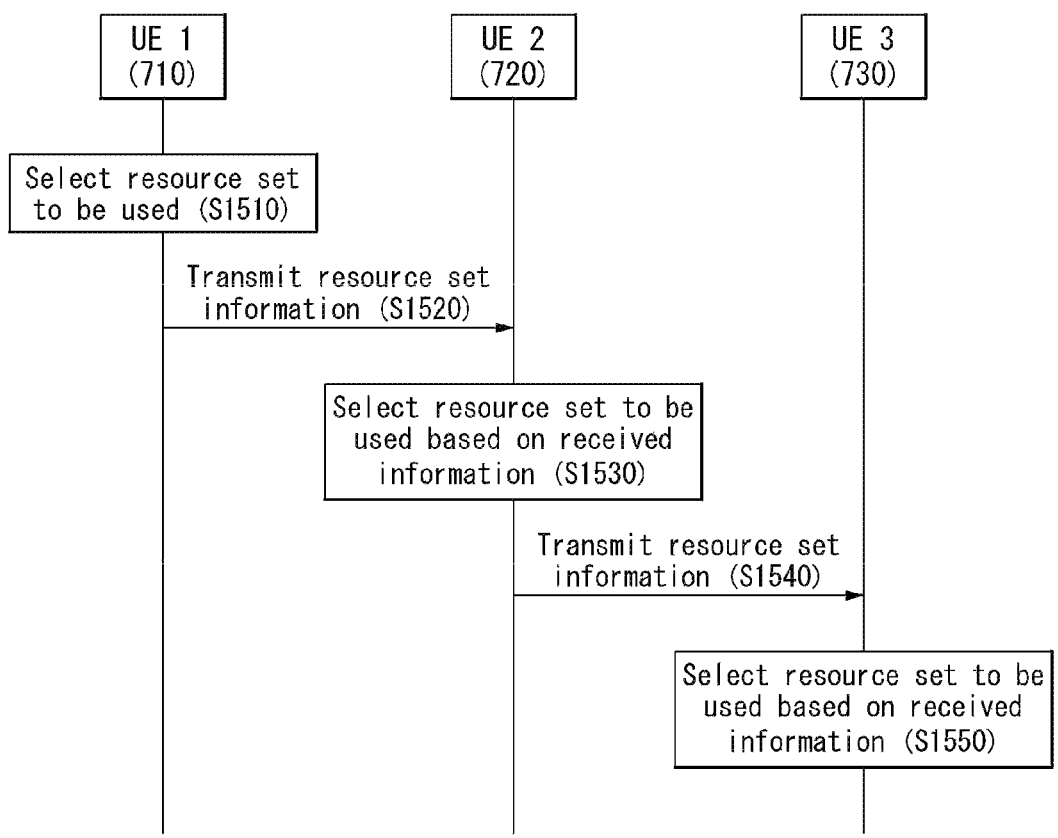
FIG. 19 is a diagram showing another example of a method for flexibly determining, by a cluster, a resource set to which an embodiment of the present invention may be applied.

FIG. 19 is a diagram showing another example of a method for flexibly determining, by a cluster, a resource set to which an embodiment of the present invention may be applied.

Referring to FIG. 19, the header of each cluster may directly select a resource set based on resource set allocation information and/or specific information received through the header of a previous cluster or relay UE.

More specifically, UE 1 710, that is, the header of a main cluster, may directly select a resource set to be used at step S1510. The UE 1 710 may not take into consideration whether the cluster of a previous tier uses which resource set because it belongs to the main cluster of a super cluster.

Accordingly, the UE 1 710 may select an optimal resource set by taking into consideration whether interference is present and perform D2D communication using the selected resource set.

Thereafter, the UE 1 710 transmits resource set allocation information or specific information for determining a resource set to be used in the cluster of a next tier to UE 2 720, that is, the cluster header of a next tier, at step S1520.

The resource set allocation information may include information about the resource set being used by the cluster of the UE 1 710 or information about resource sets that are used so far, for example, information about resource sets being used by the clusters of previous tiers if other previous tiers of the cluster to which the UE 1 710 belongs are present in addition to the resource set being used by the cluster of the UE 1 710.

The resource set allocation information may be included in a specific field (e.g., a selected_resource_set field or cumulative_ occupied_ resource_ set field) of a relaying channel and transmitted.

The UE 2 720 may select a resource set based on the received resource set allocation information or specific information at step S1530 and perform D2D communication through the selected resource set.

Thereafter, the UE 2 720 may transmit the resource set information or specific information to UE 3 730, that is, the cluster header of a next tier or relay UE, at step S1540.

In this case, the resource set information may be changed or updated from the resource set information transmitted from the UE 1 710 to the UE 2 720 and transmitted. For example, the resource set information transmitted from the UE 2 720 to the UE 3 730 may include information about a resource set being used by the cluster of the UE 2 720 or information about resource sets being used by the clusters of all of previous tiers.

The resource set information may be updated and transmitted as follows. For example, □ first, a specific field (e.g., a cumulative_occupied_resource_set field) of a relaying channel may have been configured to have the same number of bits (or associated with) as the number of resources sets. If a value "1010" has been received from the UE 2 720 or relay UE, a resource set which may be used by a cluster to which the UE 3 730 belongs is a resource set 0 or a resource set 2. Furthermore, the received value reveals that the clusters of previous tiers use a resource set 1 and a resource set 3.

If the UE 3 730 has selected the resource set 0, the value of the specific field (e.g., the cumulative_occupied_resource_set field) may be updated with "1011." However, if the UE 3 730 has selected the resource set 1 or the resource set 2 being used by the cluster of a previous tier, it may transmit the value "1010" to a next tier through a relaying channel without updating the value of the specific field (e.g., the cumulative_occupied_resource_set field).

If the UE 2 720 has not received value of the specific field (e.g., the cumulative_occupied_resource_set field) from the UE 1 710, that is, the cluster header of a previous tier, or relay UE or receives an inaccurate value, it may update the value of the specific field (e.g., the cumulative_occupied_resource_set field) with "1111" and transmit the updated value to the UE 3 730. In this case, the UE 2 720 may notify the UE 3 730, that is, the cluster header of a next tier, that there is no accurate information using a value different from the value "1111", which is an example of the value "1111."

The UE 3 730 that has received value "1111" may randomly select a resource set directly or may select a resource set by searching for the resource set.

□ Second, the values of specific fields (e.g., cumulative_occupied_resource_set fields) may be sorted based on order of tiers and displayed. That is, if the UE 1 710, that is, the cluster header of a 0-th tier, uses a resource set 3 and the UE 2 720, that is, the cluster header of a first tier, uses a resource set 1, the values of specific fields may be represented as {1000, 0010, 1111, 1111}. In this case, the value "1111" indicates that the cluster header of a second tier and the cluster header of a third tier have not yet selected resource sets.

In the process for selecting, by the UE 2 720, the resource set, information regarding that the cluster header of a next tier selects which resource set may not be required.

In an embodiment of the present invention, the value of the specific field may be represented as a value, such as {11, 01, 11, 11}, in order to reduce the size.

The UE 3 730 may select an optimal resource set based on the received resource set allocation information. In this case, if the UE 3 730 has been sufficiently far from the UE 1 710, the UE 3 730 may select a resource set selected by the UE 1 710 and perform D2D communication because the UE 1 710 and the UE 3 730 may not generate interference with each other or such interference may be weak.

If a resource set for D2D communication is selected using the aforementioned method, all of clusters within the same tier may not use the same resource set, and the K value may be "01."

In accordance with another embodiment of the present invention, the cluster of each tier may directly select a resource set without receiving resource set allocation information from the cluster of a previous tier. In this case, the K value may be "00."

In this case, different clusters of the same tier may use different resource sets. If an algorithm (e.g., minimum received energy) for selecting a resource set is the same, the headers of two adjacent clusters of the same tier may select the same resource set.

If such a method is used, the deterioration of performance attributable to in-band emission can be reduced by reducing the influence of the aforementioned near-far problem.

<Operation after Maximum Hopping Count>

Figure 20:
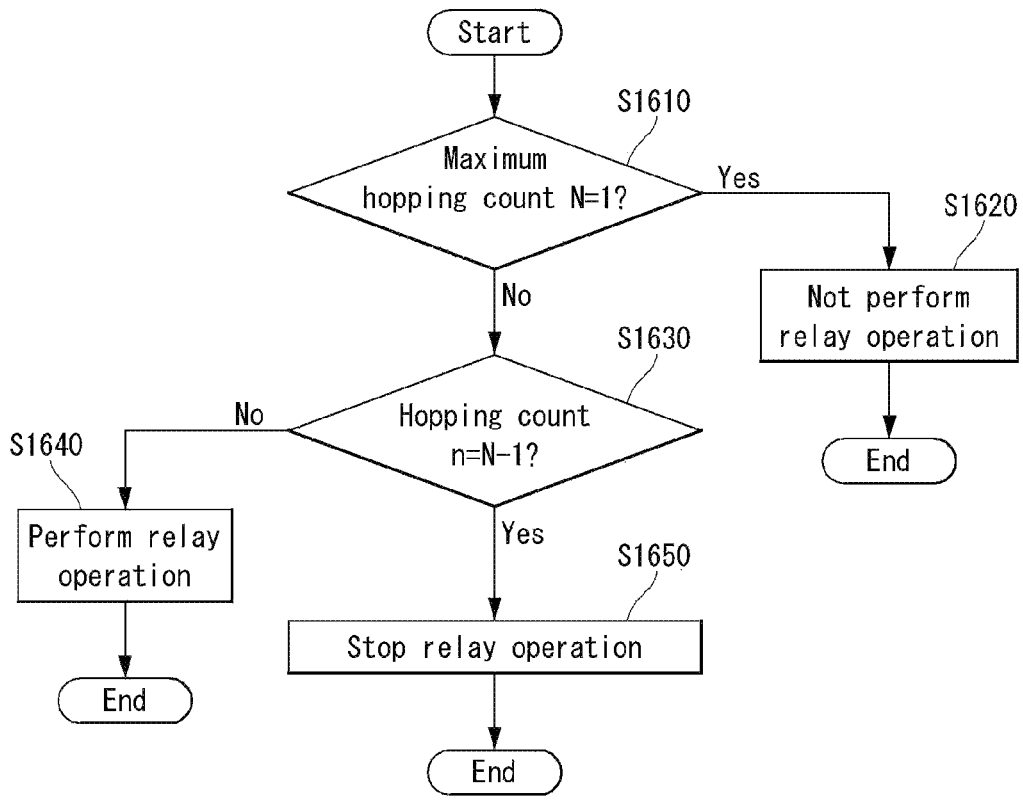
FIG. 20 is a flowchart illustrating an example in which a relay operation is stopped at a maximum hopping count to which an embodiment of the present invention may be applied.
Figure 21:
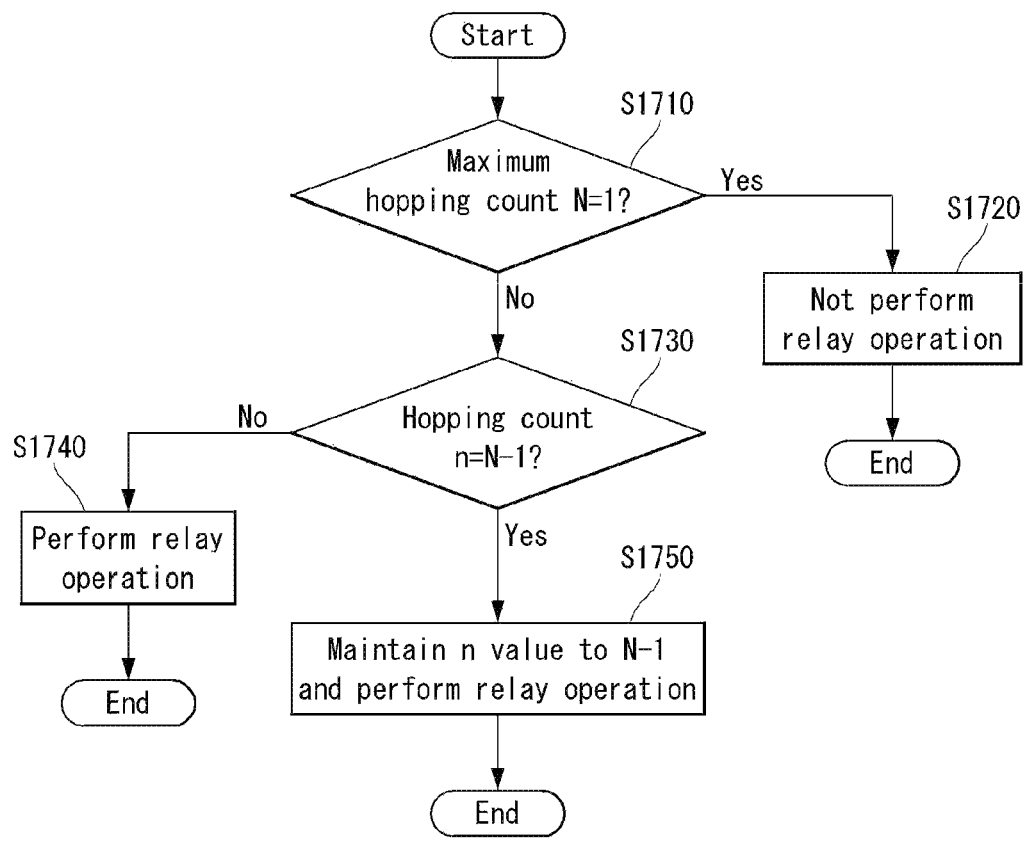
FIGS. 21 to 22 are flowcharts illustrating examples in which a relay operation continues to be performed at a maximum hopping count to which embodiments of the present invention may be applied.
Figure 22:
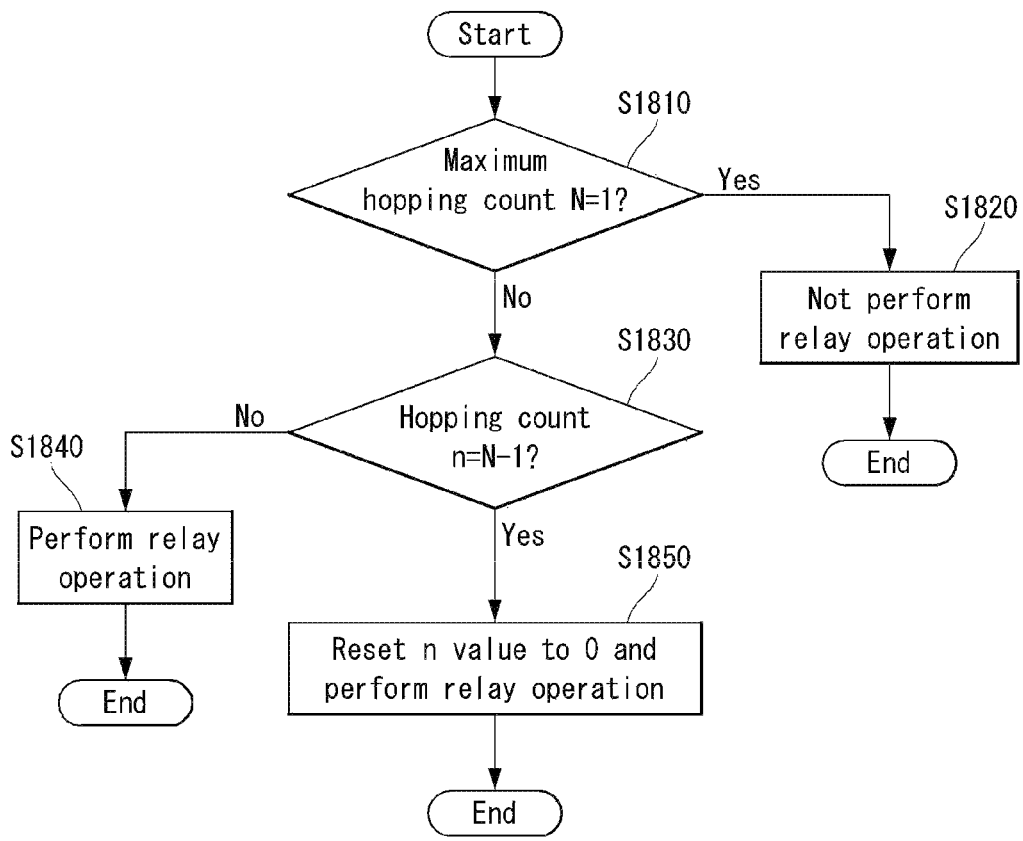

FIGS. 20 to 22 are flowcharts illustrating operations performed when a hopping count reaches a maximum hopping count.

In FIG. 10, a hopping count has been illustrated as being limited to a specific value in order to prevent the size of a super cluster from being excessively increased. In this case, the setting of the maximum hopping count (or relaying order) and an operation after the maximum hopping count are described with reference to FIGS. 20 to 22. Hereinafter, the maximum hopping count is referred to as N, and a hopping count up to a current tier is referred to as n.

FIG. 20 is a flowchart illustrating an example in which a relay operation is stopped at a maximum hopping count to which an embodiment of the present invention may be applied.

Referring to FIG. 20, UE may no longer perform a relay operation when the n value becomes identical with the N value.

More specifically, the cluster of each tier increases the n value by 1 while performing a relay operation. The n value may be used for the cluster of a next tier to 2 determine a resource set and may prevent the size of a super cluster from being excessively increased through a comparison with the N value.

The header of each cluster may determine whether an N value is 1 based on resource set allocation information or specific information received through the cluster header of a previous tier or relay UE at step S1610.

If, as a result of the determination, it is determined that the N value is set to 1, the UE does not perform a relay operation at step S1620. This may be used when synchronization information, control information and/or resource information are not shared through a relay operation in group communication in which transmission coverage is very limited or only limited users or pieces of UE are capable of access.

If, as a result of the determination, it is determined that the N value is not 1, the UE may compare an N−1 value with an n value at step S1630.

If, as a result of the comparison, the n value is found to be not identical with the N−1 value; the UE may transmit specific information to the cluster header of a next tier or relay UE through a relay operation at step S1640.

If, as a result of the comparison, however, the n value is found to be the same as the N−1 value, the UE stops a relay operation at step S1650.

In this case, a next UE of the UE that has stopped the relay operation, that is, D2D Tx UE not having synchronization information, may become a new cluster header or synchronization reference UE and may perform an operation for forming a new synchronization cluster.

The size of a super cluster can be limited and an operation for forming a new cluster can be performed through such an operation.

FIGS. 21 to 22 are flowcharts illustrating examples in which a relay operation continues to be performed at a maximum hopping count to which embodiments of the present invention may be applied.

S1710 to S1740 of FIG. 21 and S1810 to S1840 of FIG. 22 are the same as S1610 to S1640 of FIG. 16, and thus a description thereof is omitted.

If, as a result of the comparison, the n value is found to be the same as the N−1 value, the UE may continue to perform a relay operation. In this case, the UE may maintain the n value to the N−1 value or reset the n value to 0 and perform a relay operation.

More specifically, referring to FIG. 21, the UE may maintain the n value to the N−1 value and perform a relay operation at step S1750. In this case, the UE maintains synchronization and may use the same resource set as a resource set being used by the cluster of a previous tier.

The reason for this is that the N value, that is, a maximum hopping count, can be used because coverage of a super cluster has been sufficiently increased and thus a probability that a collision may occur between resource sets has been sufficiently reduced.

In an embodiment different from the embodiment of FIG. 21, referring to FIG. 22, the UE may reset the n value to 0 again and start an operation for allocating a resource set by performing a relay operation at step S1850.

The reason for this is that the n value is reset to 0 and a relay operation for allocating a resource set is performed because coverage of a super cluster has been sufficiently increased and thus a probability that the resource sets of adjacent clusters may overlap has been sufficiently reduced.

For example, if the N−1 value is 3 and the n value is 3, the UE may reset the n value to 0 and perform a relay operation. The cluster header of a next tier may reset the n value to 1 and continue to perform a relay operation.

Figure 23:
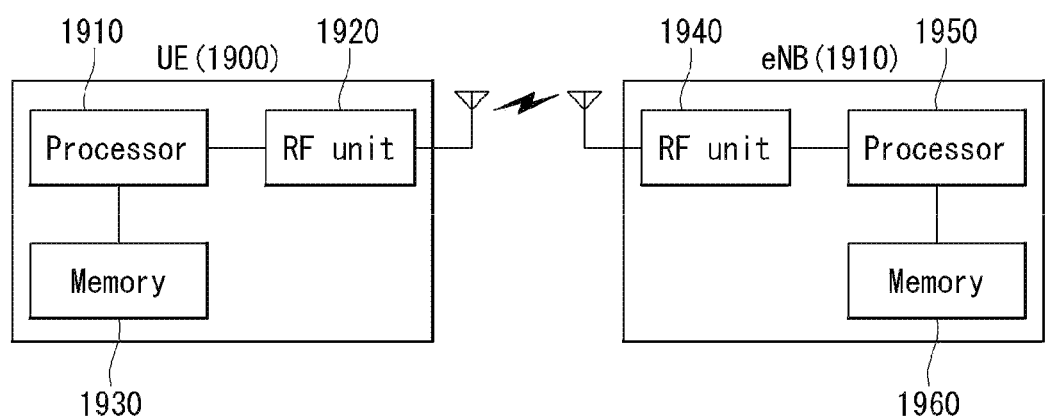
FIG. 23 is a block diagram showing UE and an eNB in a wireless communication system according to an embodiment of the present invention.

FIG. 23 is a block diagram showing UE and an eNB in a wireless communication system according to an embodiment of the present invention.

The UE 10 includes a processor 1910, a Radio Frequency (RF) unit 1920, and memory 1930. The processor 1910 implements the proposed functions, processes and/or methods. The layers of a radio interface protocol may be implemented by the processor 1910.

The RF unit 1920 is connected to the processor 1910 and transmits and/or receives radio signals. The memory 1930 is connected to the processor 1910 and stores various pieces of information for driving the processor 1910.

The UE 10 may perform D2D communication with other pieces of UE through the RF unit 1920 and transmit resource set allocation information to relay UE.

The eNB 20 includes a Radio Frequency (RF) unit 1940, a processor 1950, and memory 1960. The processor 1950 implements the proposed functions, processes and/or methods. The layers of a radio interface protocol may be implemented by the processor 1950.

The RF unit 1940 is connected to the processor 1950 and transmits and/or receives radio signals. The RF unit 1940 is connected to the UE 1900 and transmits and/or receives radio signals. Accordingly, the RF unit 1940 may transmit control information or resource set allocation information for D2D communication to the UE 10.

The memory 1960 is connected to the processor 1950 and stores various pieces of information for driving the processor 1950.

The processor 1910, 1950 may include Application-Specific Integrated Circuits (ASICs), other chipsets, logic circuits and/or data processors. The memory 1930, 1960 may include Read-Only Memory (ROM), Random Access Memory (RAM), flash memory, memory cards, storage media and/or other storage devices.

The RF unit 1920, 1940 may include baseband circuits for processing radio signals. When an embodiment is implemented in software, the aforementioned scheme may be implemented as a module (or process or function) that performs the aforementioned function. The module may be stored in the memory 1930, 1960 and executed by the processor 1910, 1950.

The memory 1930, 1960 may be placed inside or outside the processor 1910, 1950 and may be connected to the processor 1910, 1950 using a variety of well-known means.

The present invention may be substituted, modified, and changed in various ways by those skilled in the art to which the present invention pertains without departing from the technical spirit of the present invention and thus is not limited to the aforementioned embodiments and the accompanying drawings.

INDUSTRIAL APPLICABILITY

The present invention relates to a resource allocation method and apparatus in a wireless communication system. In particular, the present invention relates to a method and apparatus for forming a cluster for performing D2D communication and allocating resources between clusters.

The invention claimed is:

1. A method for allocating D2D resources using relay User Equipment (UE) in a wireless communication system supporting D2D communication, the method performed by the relay UE comprising:
  receiving D2D resource allocation information related to a first resource set used in a first cluster from a first cluster head UE; and
  transmitting the received D2D resource allocation information to a second cluster head UE,
  wherein the D2D resource allocation information includes at least one of D2D resource set configuration information indicating a configuration of D2D resource sets used in D2D communication, D2D resource set use information indicating a D2D resource set which is currently used, or D2D resource set indication information indicating a D2D resource set to be used in a next cluster, and wherein the D2D resource set is allocated for each cluster.

2. The method of claim 1, further comprising:
determining, by the second cluster head UE, a second resource set used in the second cluster based on the D2D resource allocation information transmitted by the relay UE.

3. The method of claim 2,
wherein the second cluster head UE updates the D2D resource allocation information based on information related to the determined second resource set.

4. The method of claim 1,
wherein the D2D resource allocation information further includes at least one of information of a cluster to which the relay UE belongs, an index of a cluster which has triggered a relay, an index of a cluster head, an ID of the relay UE, or a hopping counter information indicating hopping count.

5. The method of claim 1, further comprising:
performing at least one hopping operation in order to transmit the received D2D resource allocation information to the second cluster.

6. The method of claim 1,
wherein at least one of the first cluster or the second cluster is formed between adjacent UEs.

7. The method of claim 1,
wherein resource sets for D2D communication are allocated to the first cluster and the second cluster using a Time Division Multiplexing (TDM) method, and
wherein resources for D2D communication are allocated to UEs included in the first cluster and the second cluster using a Frequency Division Multiplexing (FDM) method.

8. The method of claim 1, further comprising:
sharing, by the first cluster header and the second cluster header, a plurality of resource set configuration information.

9. The method of claim 1, wherein the first cluster head UE sets a maximum hopping count for limiting a hopping count of the relay UE.

10. The method of claim 9, further comprising:
comparing, by the second cluster head UE, the hopping count with the set maximum hopping count when the maximum hopping count is set to be greater than 1,
wherein the hopping count indicates a count that the D2D resource allocation information has been relayed through a relay operation.

11. The method of claim 10,
wherein when, as a result of the comparison, the hopping count and a value obtained by subtracting 1 from the maximum hopping count are the same, the hopping count is maintained to be identical with the maximum hopping count and a relay operation is performed.

12. The method of claim 10,
wherein when, as a result of the comparison, the hopping count and a value obtained by subtracting 1 from the maximum hopping count are the same, the hopping count is reset to 0 and a relay operation is performed again.

13. The method of claim 10,
wherein when, as a result of the comparison, the hopping count and a value obtained by subtracting 1 from the maximum hopping count are the same, a relay operation is stopped.

14. The method of claim 1,
wherein the first resource set or the second resource set is not a resource set used in an eNB.

15. A method for allocating D2D resources using relay User Equipment (UE) in a wireless communication system supporting device-to-device communication, the method performed by a first cluster head UE comprising:
selecting a first resource set to be used in the first cluster; and
transmitting D2D resource set allocation information related to the first resource set to a second cluster head UE through relay UE,
wherein the D2D resource allocation information includes at least one of D2D resource set configuration information indicating a configuration of D2D resource sets used in D2D communication, D2D resource set use information indicating a D2D resource set which is currently used, or D2D resource set indication information indicating a D2D resource set to be used in a next cluster, and
wherein the D2D resource set is allocated for each cluster.

16. The method of claim 15, wherein the first cluster is formed between adjacent UEs.

17. A method for allocating D2D resources using relay User Equipment (UE) in a wireless communication system supporting device-to-device communication, the method performed by a cluster head UE comprising:
receiving D2D resource allocation information for selecting a resource set from a head UE of a previous cluster through relay UE; and
selecting a resource set based on the D2D resource allocation information,
wherein the D2D resource allocation information includes at least one of D2D resource set configuration information indicating a configuration of D2D resource sets used in D2D communication, D2D resource set use information indicating a D2D resource set which is currently used, or D2D resource set indication information indicating a D2D resource set to be used in a next cluster, and
wherein the D2D resource set is allocated for each cluster.

18. The method of claim 17, wherein the cluster is formed between adjacent UEs.

19. An apparatus for allocating D2D resources using relay User Equipment (UE) in a wireless communication system supporting D2D communication, the apparatus comprising:
a communication unit configured to transmit and receive signals in a wired and/or wireless manner; and
a control unit operatively connected to the communication unit,
wherein the control unit receives D2D resource allocation information related to a first resource set used in a first cluster from a first cluster head UE through the communication unit and transmits the received D2D resource allocation information to a second cluster head UE through the communication unit,
the D2D resource allocation information includes at least one of D2D resource set configuration information indicating a configuration of D2D resource sets used in D2D communication, D2D resource set use information indicating a D2D resource set which is currently used, or D2D resource set indication information indicating a D2D resource set to be used in a next cluster, and
wherein the D2D resource set is allocated for each cluster.

* * * * *